(12) United States Patent
DelZotto

(10) Patent No.: US 7,401,999 B2
(45) Date of Patent: *Jul. 22, 2008

(54) PRE-CAST DECK AND DOCK SYSTEM

(76) Inventor: Laurie Ann DelZotto, 4950 NW. 150th Ave., Morriston, FL (US) 32668

( * ) Notice: Subject to any disclaimer, the term of this patent is extended or adjusted under 35 U.S.C. 154(b) by 72 days.

This patent is subject to a terminal disclaimer.

(21) Appl. No.: 11/350,066

(22) Filed: Feb. 8, 2006

(65) Prior Publication Data

US 2006/0127181 A1 Jun. 15, 2006

(51) Int. Cl.
*B63C 1/08* (2006.01)

(52) U.S. Cl. .................... 405/5; 405/4; 52/295

(58) Field of Classification Search .......... 405/4, 405/5, 218, 284–286, 262, 31; 52/294, 295; 114/44, 45, 48
See application file for complete search history.

(56) References Cited

U.S. PATENT DOCUMENTS

| | | | | |
|---|---|---|---|---|
| 3,270,698 A | * | 9/1966 | Fort | 114/45 |
| 3,381,483 A | * | 5/1968 | Huthsing, Jr. | 405/285 |
| 3,503,467 A | * | 3/1970 | Lindblad | 182/97 |
| 3,952,528 A | * | 4/1976 | Donkersloot | 405/221 |
| 4,440,527 A | * | 4/1984 | Vidal | 405/284 |
| 4,619,560 A | * | 10/1986 | Crinnion et al. | 405/284 |
| 4,804,298 A | * | 2/1989 | Nasby, Jr. | 405/218 |
| 4,842,442 A | * | 6/1989 | Caulfield | 405/284 |
| 5,145,287 A | * | 9/1992 | Hooper et al. | 405/262 |
| 5,911,545 A | * | 6/1999 | Heitkamp | 405/275 |
| 6,015,244 A | * | 1/2000 | Wells | 405/22 |
| 6,033,155 A | * | 3/2000 | Irvine et al. | 405/281 |
| 6,312,196 B1 | * | 11/2001 | Mansfield | 405/286 |
| 6,402,435 B1 | * | 6/2002 | Lewis | 405/274 |
| 6,491,473 B2 | * | 12/2002 | Veazey | 405/16 |
| 7,033,107 B2 | * | 4/2006 | DelZotto | 405/5 |
| 2002/0095892 A1 | * | 7/2002 | Johnson | 52/295 |
| 2006/0029471 A1 | * | 2/2006 | DelZotto | 405/4 |
| 2006/0062633 A1 | * | 3/2006 | DelZotto | 405/5 |
| 2006/0062634 A1 | * | 3/2006 | DelZotto | 405/5 |

* cited by examiner

*Primary Examiner*—Frederick L Lagman
(74) *Attorney, Agent, or Firm*—Frank B. Arena, Esq.

(57) ABSTRACT

A pre-cast article of manufacture and system, a deck and dock is disclosed utilizing 2 main components, beam(s) and slab(s). Only one component, the cantilever beam, is required for the invention. The preferred embodiment uses a cantilevered Z beam and other embodiments use a drop-cantilever beam and straight-cantilever beam. The cantilever beam may be any shape or size. Optional accessories are also disclosed that may be added such as hand rail(s), boat bumper(s) and water access ladder(s).

11 Claims, 43 Drawing Sheets

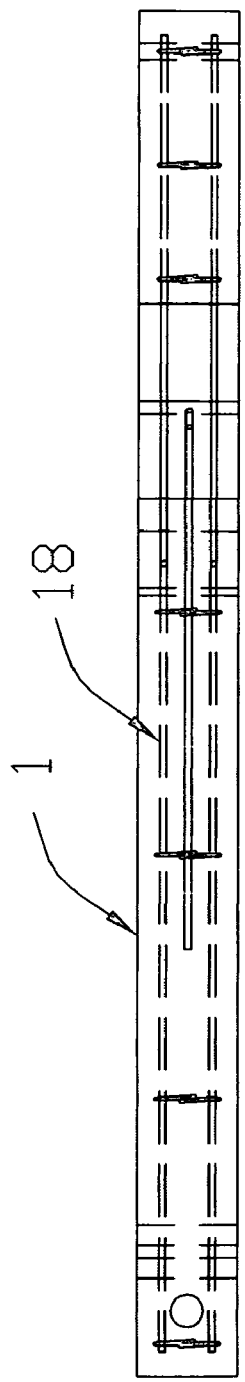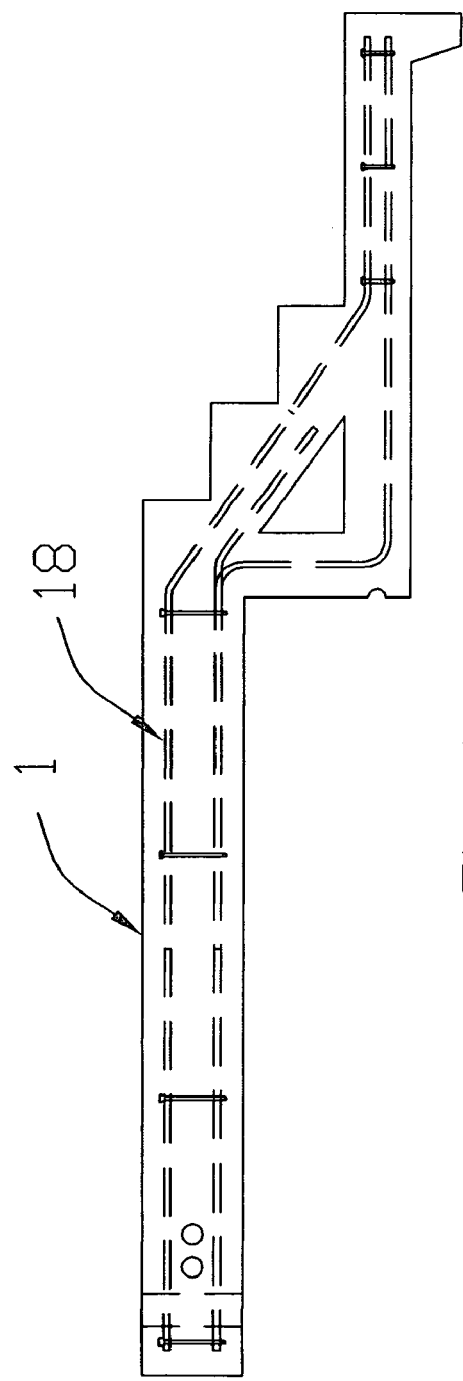

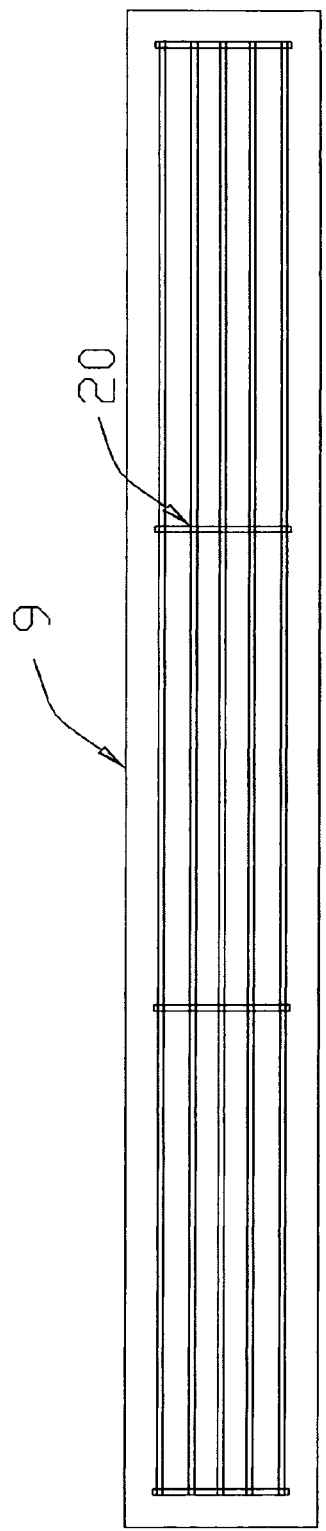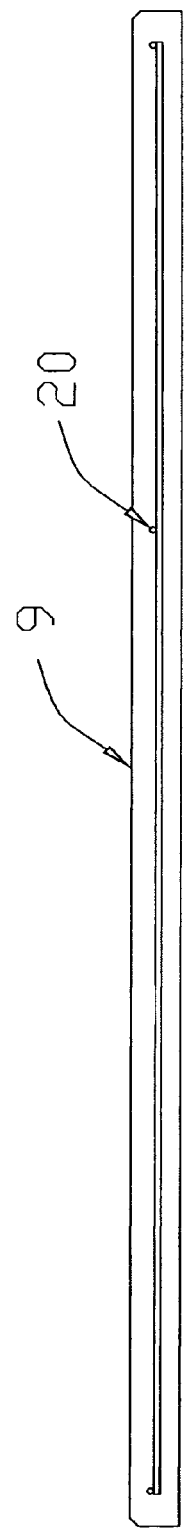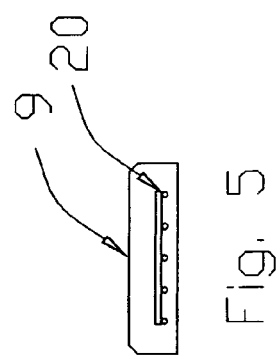

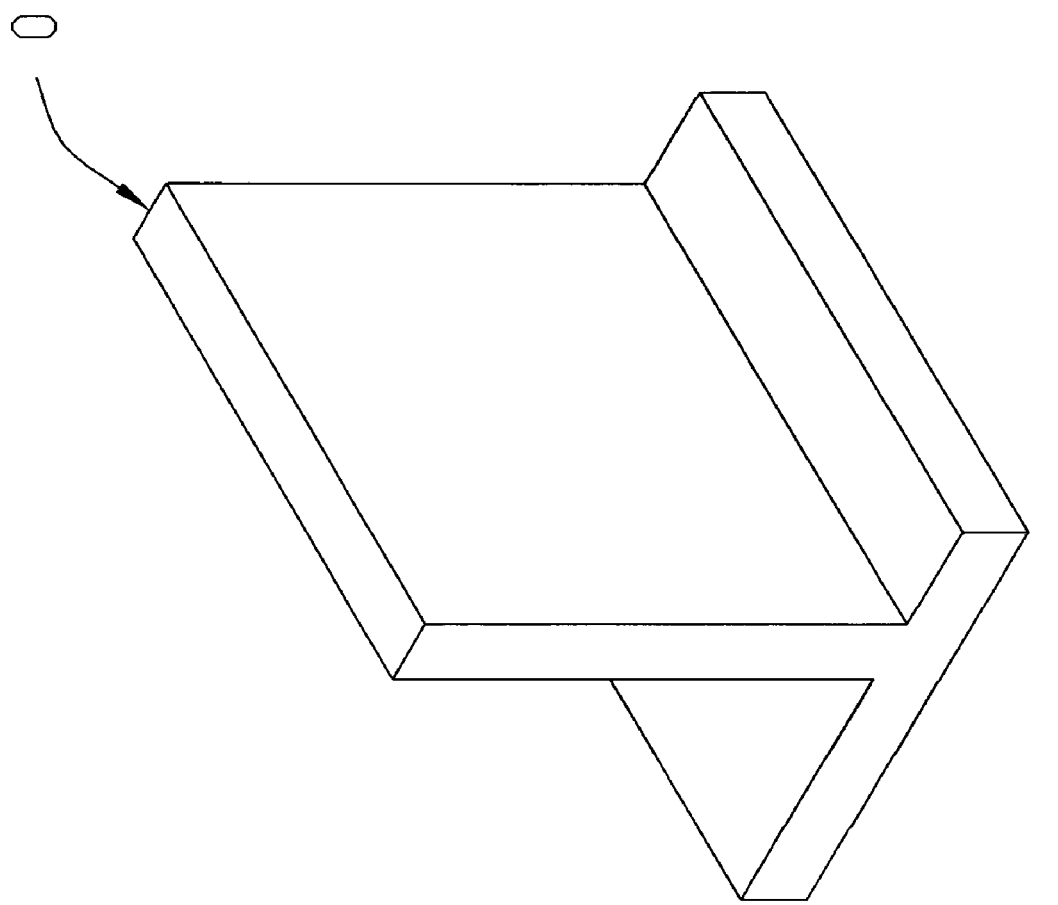

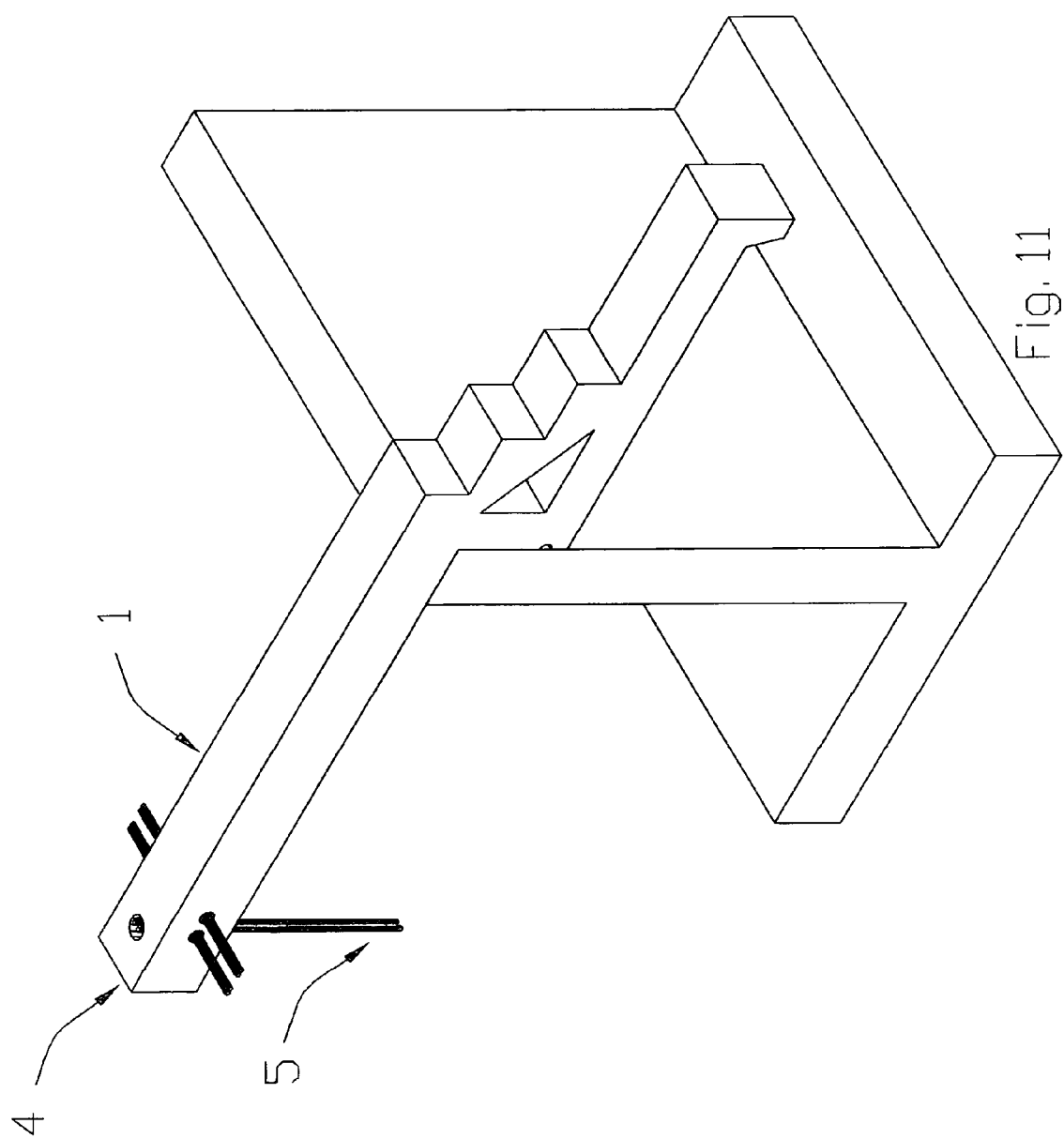

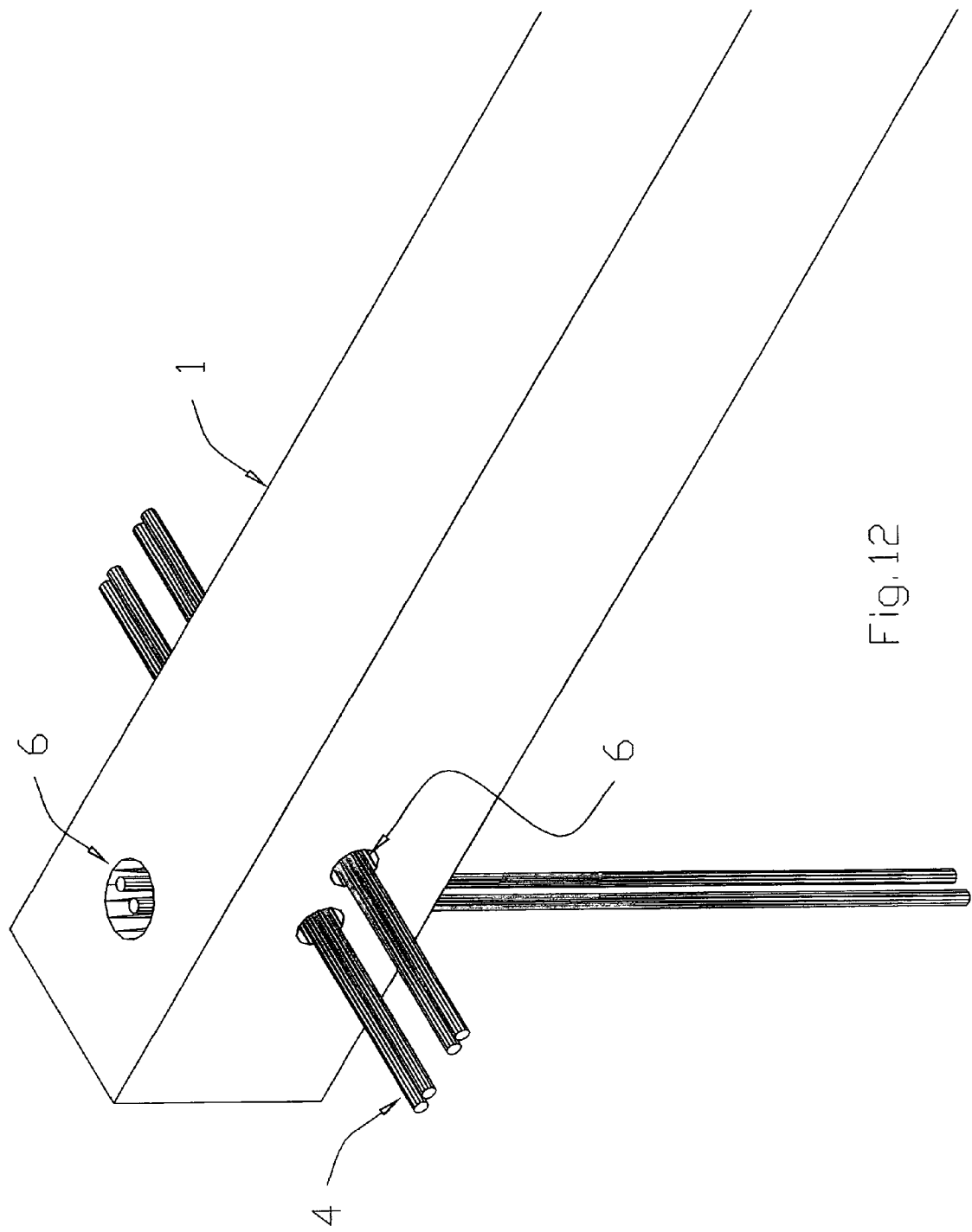

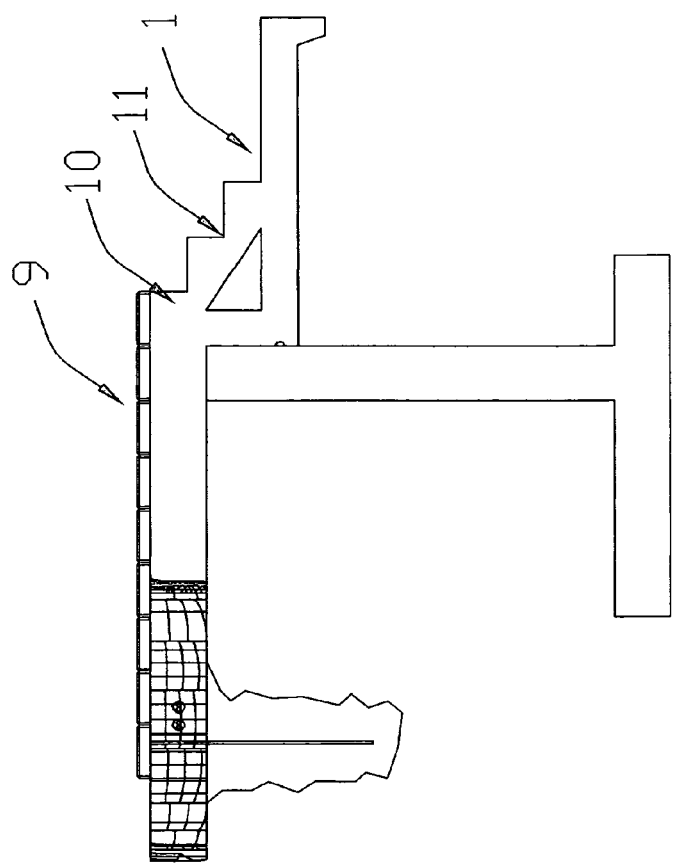
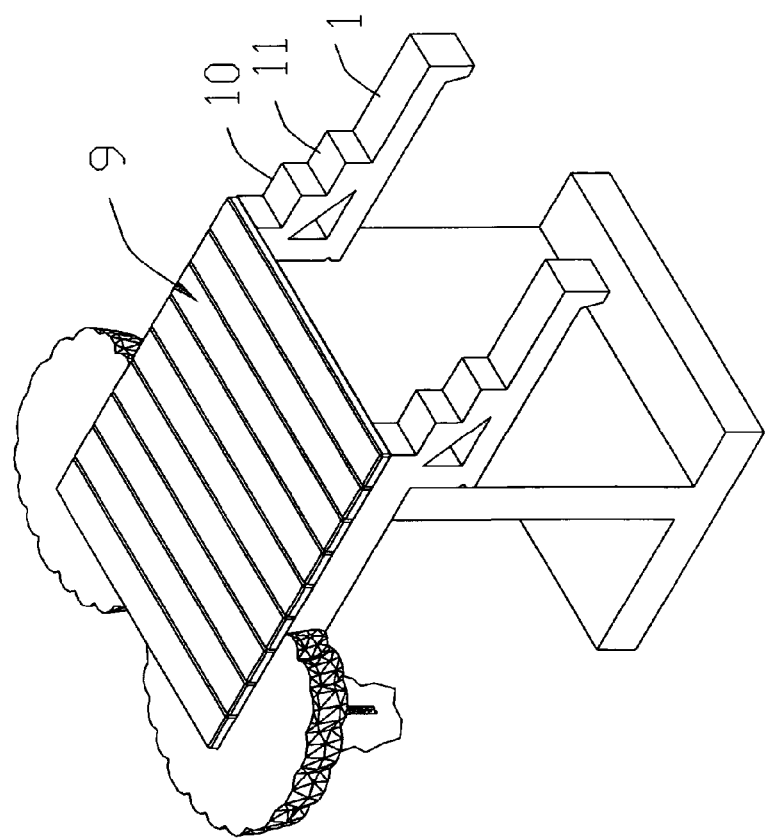

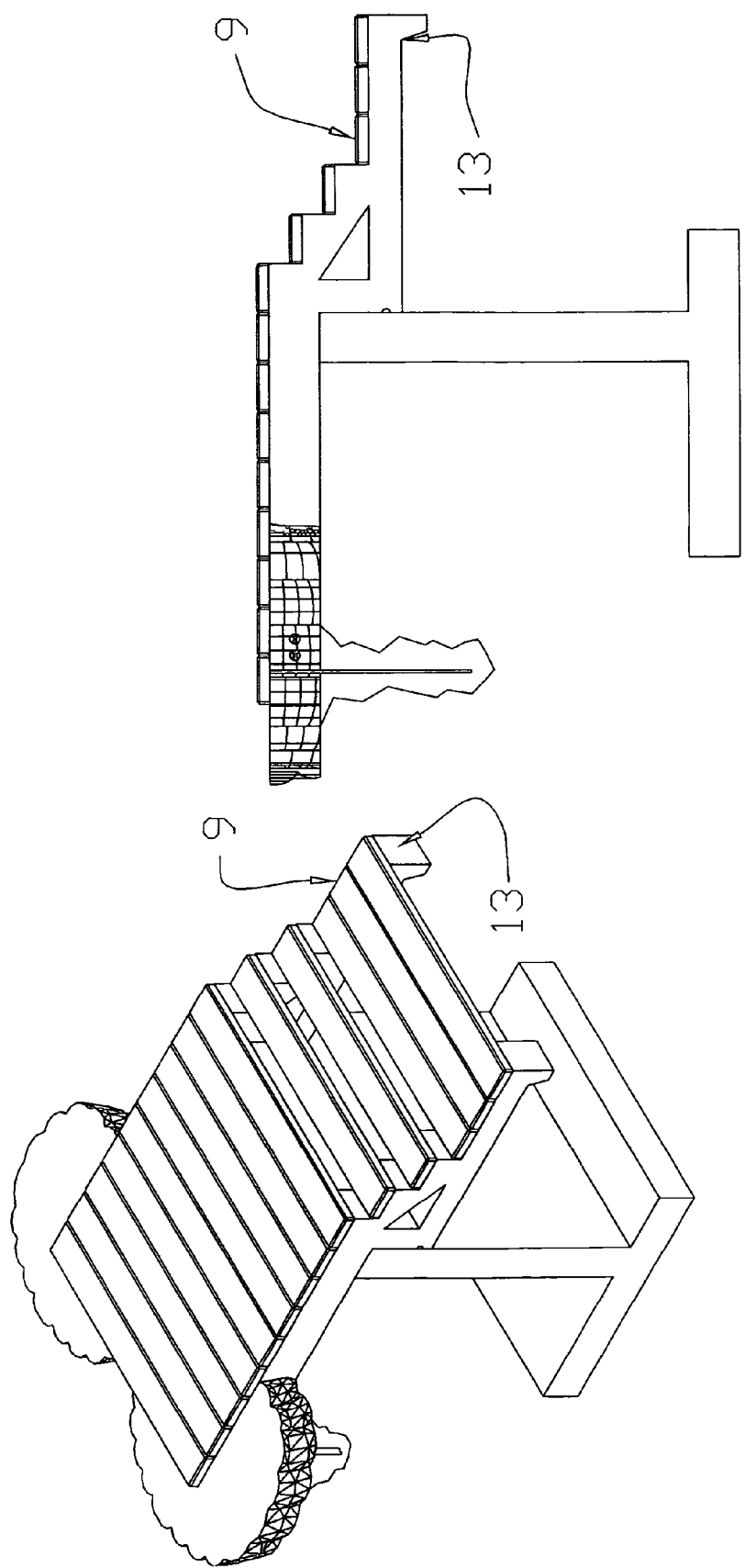

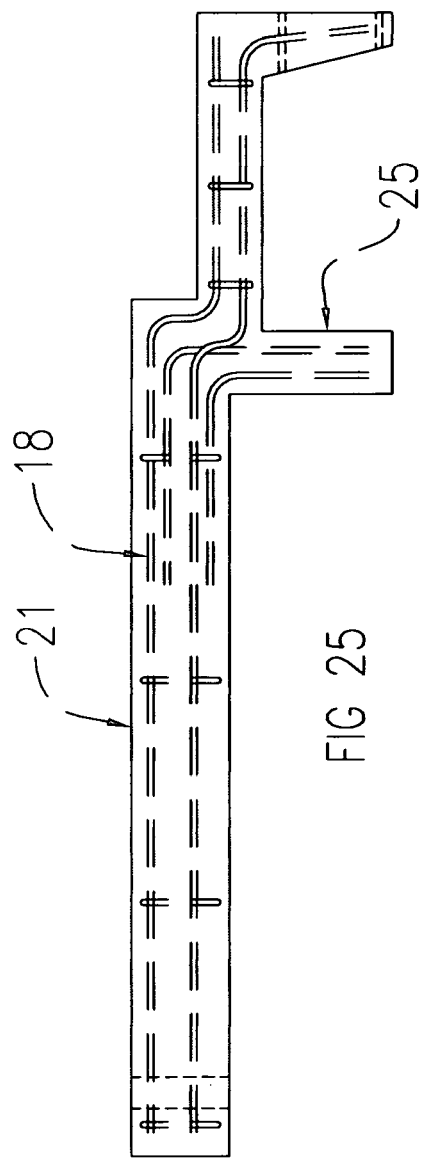
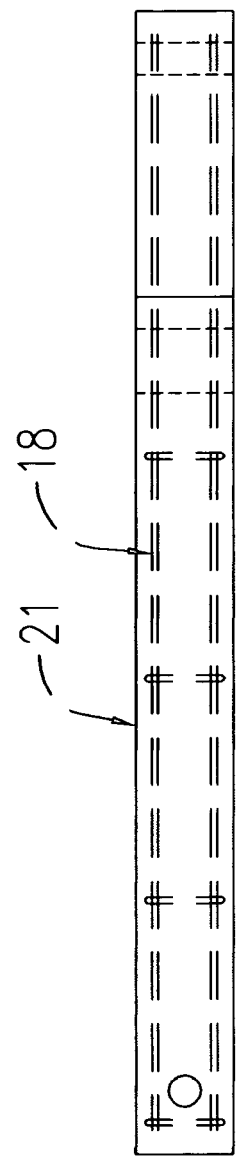
FIG 25
FIG 26

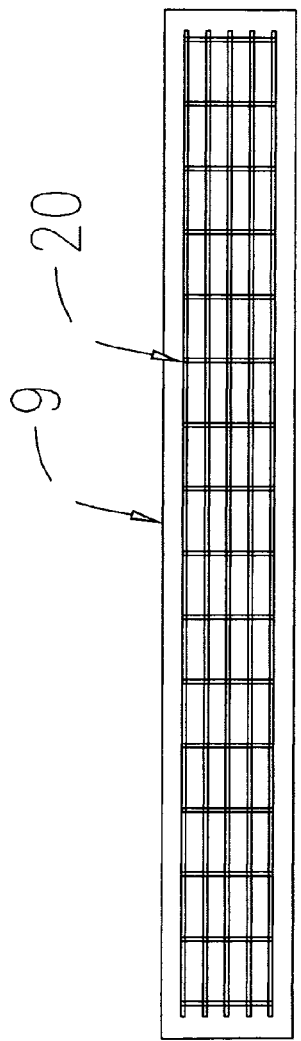
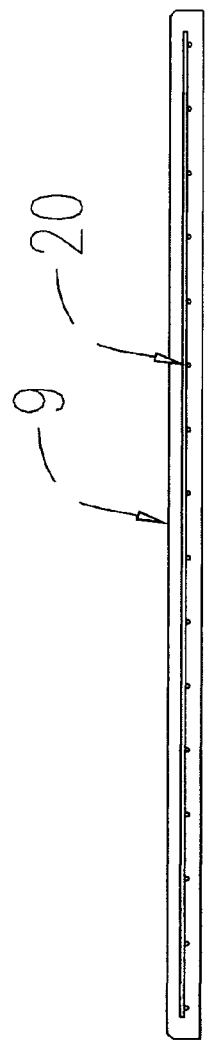
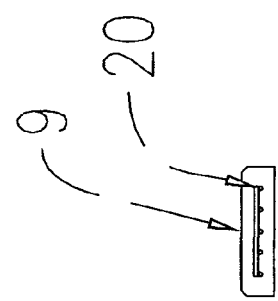
FIG 27
FIG 28
FIG 29

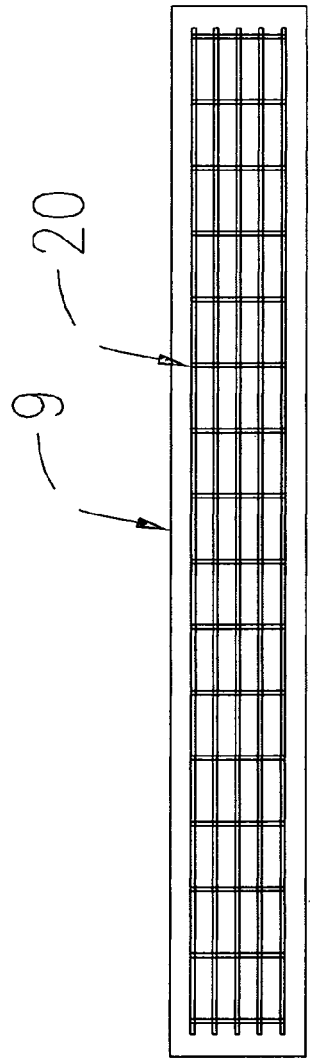
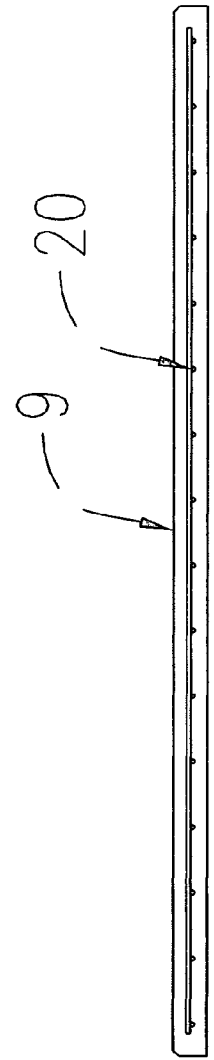
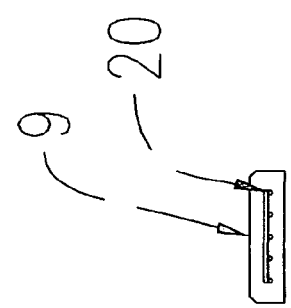
FIG 49
FIG 50
FIG 51

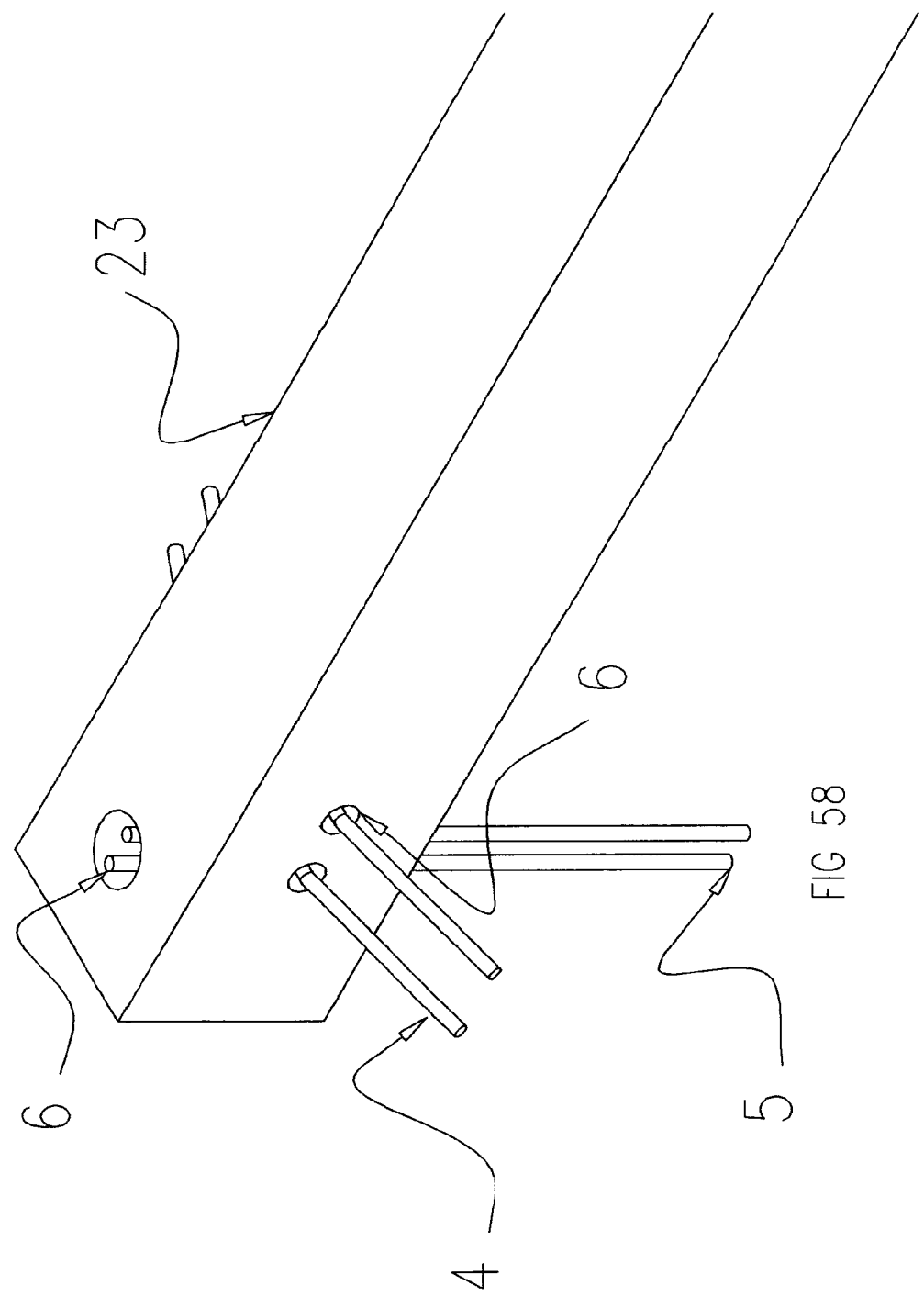

PRE-CAST DECK AND DOCK SYSTEM

The status of the priority Nonprovisional Applications this Application incorporates by reference and claims the benefit and priority of are as follows: application Ser. No. 10/912,719 filed 5 Aug. 2004 for "Pre-cast Deck, Dock Steps and Dock System" was issued as U.S. Pat. No. 7,033,107 on Apr. 25, 2006; applications Ser. No. 11/268,136 filed Nov. 7, 2005 and Ser. No. 11/268,135 filed Nov. 7, 2005 have been abandoned.

BACKGROUND OF THE INVENTION

1. Field of the Invention

The present invention relates generally to pre-cast concrete products. The invention particularly relates to pre-cast decks, dock steps and docks (alone or in combination), as they are commonly referred to in the marine industry. The invention more particularly relates to pre-cast decks, dock steps and docks (alone or in combination) utilized over existing sea walls and optional unique anchoring systems using cantilever methods and earth support behind the existing sea wall and not using conventional vertical pilings driven into the sea floor per is the custom and practice in the marine industry. Additionally, the existing sea wall is not stressed laterally by the dock pulling on the existing sea wall in the conventional manner due to the unique anchoring method on the shoreline. This invention reinforces and earth anchors the existing (or optionally new) sea wall.

2. Description of the Prior Art

On the shoreline, sea walls and docks for mooring boats and waterfront activities have been in use for many years. The shoreline (or sea wall) define the inland side (inland end) of the shoreline (or sea wall) and the water side (water end) of the shoreline (or sea wall) where the water activities (swimming, boating, diving, etc.) occur. Conventional dock systems use vertical pilings, typically made of wood or concrete, driven into the sea floor and used to support the dock above the water line on beams spanning between the pilings. Additionally, docks used in conjunction with an existing sea wall typically use the sea wall for a support member at the water's edge. This prior art method places additional loads and stress on the existing sea wall via a ledge anchored to the top water side face of the sea wall and used for support of the dock. This is especially important for safety reasons, if the existing sea wall was not originally designed for the added loads and stress. These added loads and stress on the existing sea wall may cause structural or at the least cosmetic damage to the existing sea wall.

U.S. patent application Ser. No. 10/042,871 by Johnson discloses a cantilevered structural support and mentions uses of docks and piers, but contains discloses no use of the seawall, as does the present invention.

None of the prior art addresses or solves this problem. This new and useful pre-cast deck, dock steps and dock (alone or in combination) invention addresses these marine dock industry problems in a safe and economical manner.

SUMMARY OF THE INVENTION

It is an object of the invention to help prevent disturbance of the sea floor for docks and dock step systems when constructed in conjunction with sea walls.

It is another object of the invention to allow a pre-cast, modular component or system to be installed over existing or new sea walls with an optional independent anchoring system that reduces loads and stress on the sea wall.

It is a further object of the present invention to optionally allow the earth behind the sea wall to be an anchor point for the deck or dock step(s) or dock system comprising solely a cantilever beam. Another embodiment includes supporting at least one pre-cast slab used as a deck. Another embodiment includes at least one pre-cast slab used as a step. Another embodiment includes at least one pre-cast slab used as a dock extending out over the surface of the water with no piling supports in the sea floor. Any or all of the components may be used either alone or in combination.

Another object is to provide fast, efficient dock erection with the least on-site field work needed due to the pre-cast design and construction.

At least one, some or all of the objects of this invention are achieved or addressed and the present invention provides a new and useful system and article of manufacture comprising a pre-cast deck, dock step(s) and dock, (alone or in combination, the preferred embodiment of which is disclosed in FIG. 21, FIG. 22, FIG. 23 and FIG. 24) which can be integrated anywhere into the shoreline but preferably integrated into or attached to the existing sea wall and cantilevered at or over the water's surface for boating, swimming or other uses.

This invention is of simple construction that is easy to make and use and needs very little maintenance.

BRIEF DESCRIPTION OF THE DRAWINGS

FIG. 1 depicts a side view of the cantilever Z beam with reinforcement bars therein.

FIG. 2 depicts a top view of the cantilever Z beam with reinforcement bars therein.

FIG. 3 depicts a top longitudinal sectional view of the slab with reinforcing bars.

FIG. 4 depicts a side longitudinal sectional view of the slab with reinforcing bars, FIG. 5 depicts a cross-sectional view of the slab with reinforcing bars.

FIG. 6 depicts the optional pre-cast sea wall component.

FIG. 11 depicts the beam, sea wall and industry standard rebars in the holes of the inland side of the beam.

FIG. 12 depicts a close-up detail of the industry standard rebars in the holes of the inland side of the beam.

FIG. 17 depicts a perspective view of the partial system with the deck slabs on the top surface of the inland end of the beam.

FIG. 18 depicts a side sectional view of the partial system with the deck slabs on the top surface of the inland end of the beam.

FIG. 21 depicts a perspective view of the completed system with the deck slabs on the top surface of the inland end of the beam, step slabs integrated into the top surface of the beam and dock slabs on the top surface of the water side of the beam.

FIG. 22 depicts a side sectional view of the completed system with the deck slabs on the top surface of the inland end of the beam, step slabs integrated into the top surface of the beam and dock slabs on the top surface of the water side of the beam.

FIGS. 25-46 depict another embodiment of the deck and dock system, similar to FIGS. 1-24. FIG. 33 discloses another embodiment of the invention that could be used solely with one drop-cantilever beam if desired by the user.

FIGS. 47-68 depict another embodiment of the deck and dock system, similar to FIGS. 1-24. FIG. 55 discloses another embodiment of the invention that could be used solely with one straight-cantilever beam if desired by the user.

DETAILED DESCRIPTION OF THE PREFERRED EMBODIMENT

Figure 7:
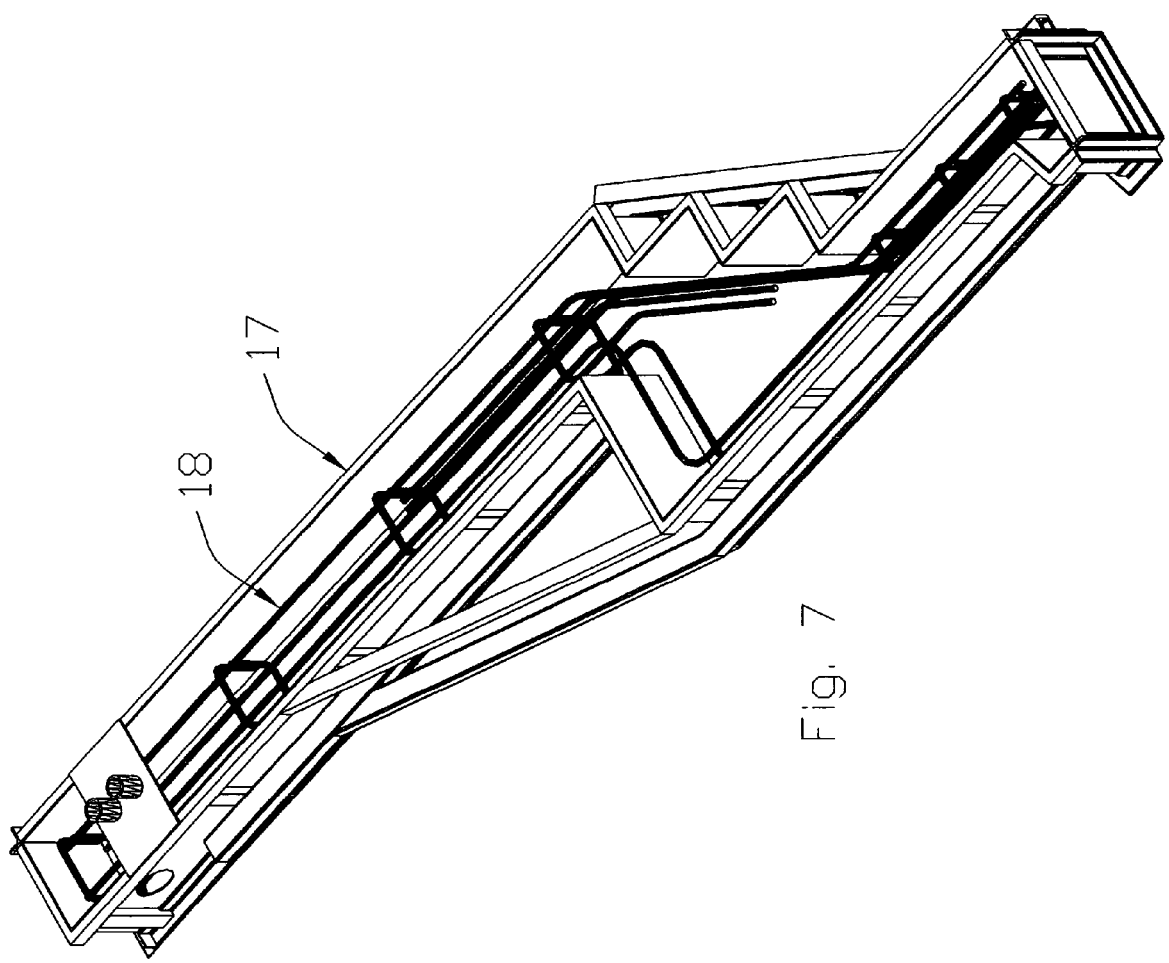
FIG. 7 shows the pre-cast concrete mold for the cantilever Z beam with reinforcement bars therein, ready to pour concrete for manufacture.

The apparatus of the invention is conveniently fabricated by conventional and standard methods using conventional and standard materials common in the concrete and pre-cast fabrication industries. The preferred material is pre-cast concrete, but other materials may be used.

For example, the dock and dock system ("the system") may be fabricated from aluminum, stainless steel or like metals or any other suitable material, even wood. The system may also be fabricated from non-metallic materials for lighter weight and corrosion resistance. Theses non-metallic materials include, among others, conventional polymers such as, for example, polystyrene, polycarbonate, polyurethane, polyethylene, phenol formaldehyde resins, polybutylene, Teflon and the like. These above-mentioned materials are examples and do not limit the types of materials that can be used to make and use the system; any and all suitable materials may be used. The components of the system may be integrated together by standards means such as pouring, casting, welding, bolting, gluing, riveting, or any other suitable means.

The article of manufacture, system and method of making and using the invention will now be further described and exemplified by reference to the various specific embodiments set forth in the drawings. The Figures illustrate views of the preferred embodiment of the invention.

Figure 9:
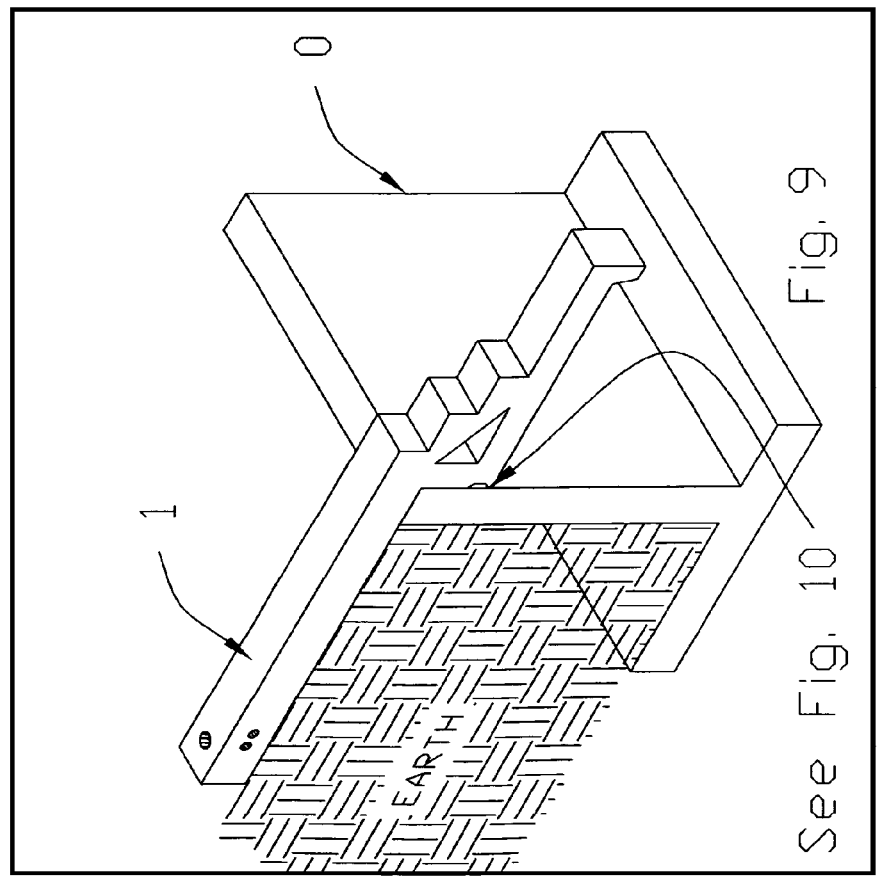
FIG. 9 depicts the optional pre-cast sea wall component with the cantilever Z beam placed perpendicular to and on top of the sea wall, with the inland side of the beam extending over the prepared earth and the water end of the beam extending over the water's surface. This is one embodiment of the invention that could be used solely with one cantilever Z beam if desired by the user.
Figure 14:
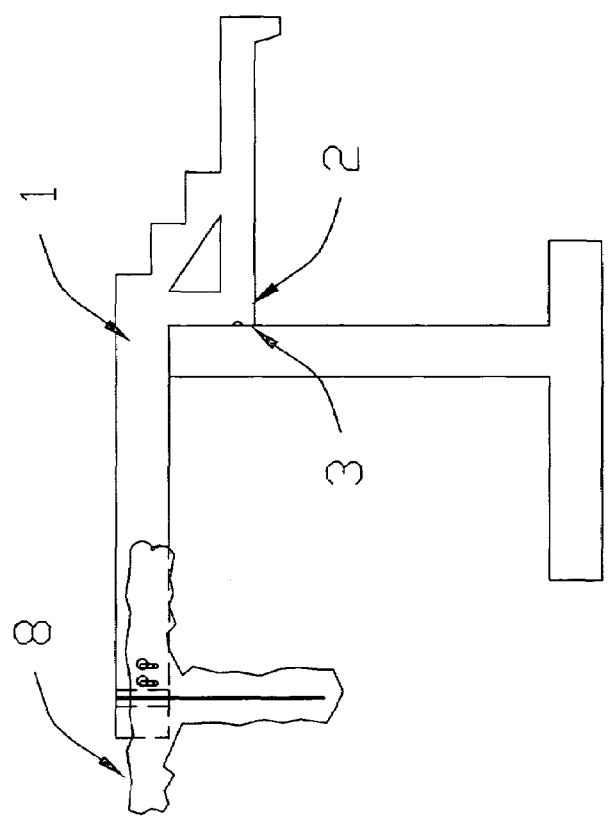
FIG. 14 depicts a side sectional view of the partial system with the earth anchor (concrete deadman) poured in place, securing the inland side of the beam.
Figure 13:
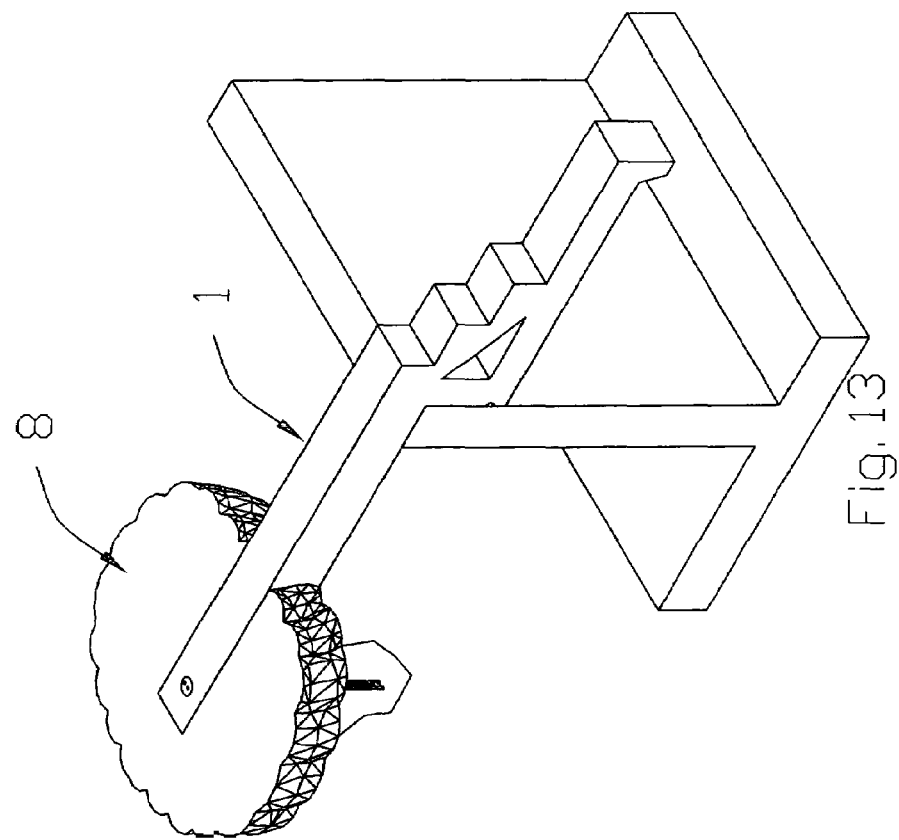
FIG. 13 depicts a perspective view of the partial system with the earth anchor (concrete deadman) poured in place, securing the inland side of the beam.
Figure 33:
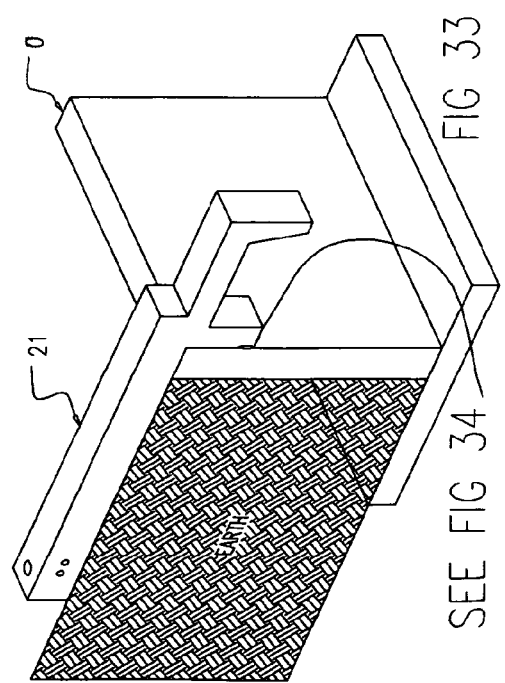
Figure 35:
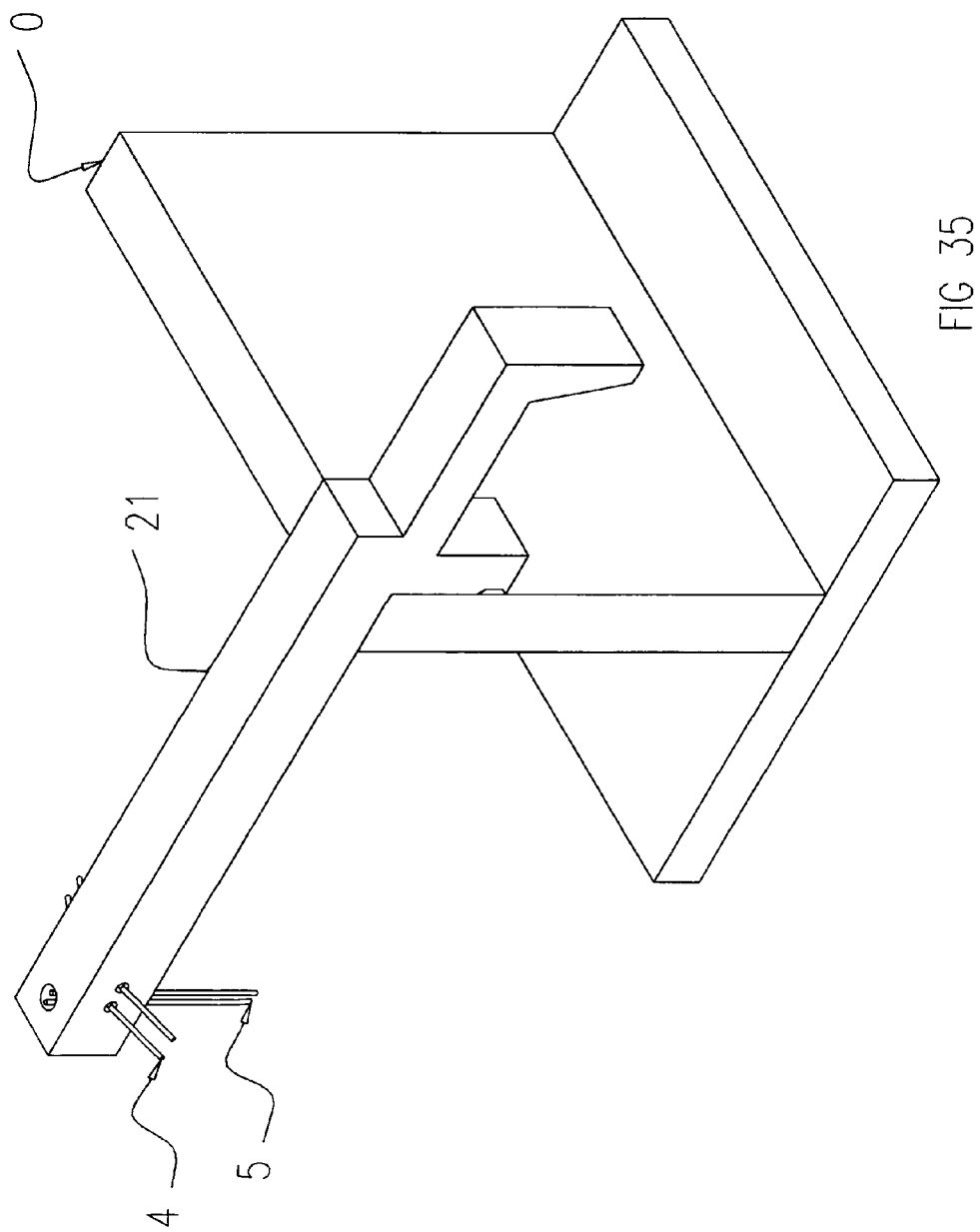
Figure 36:
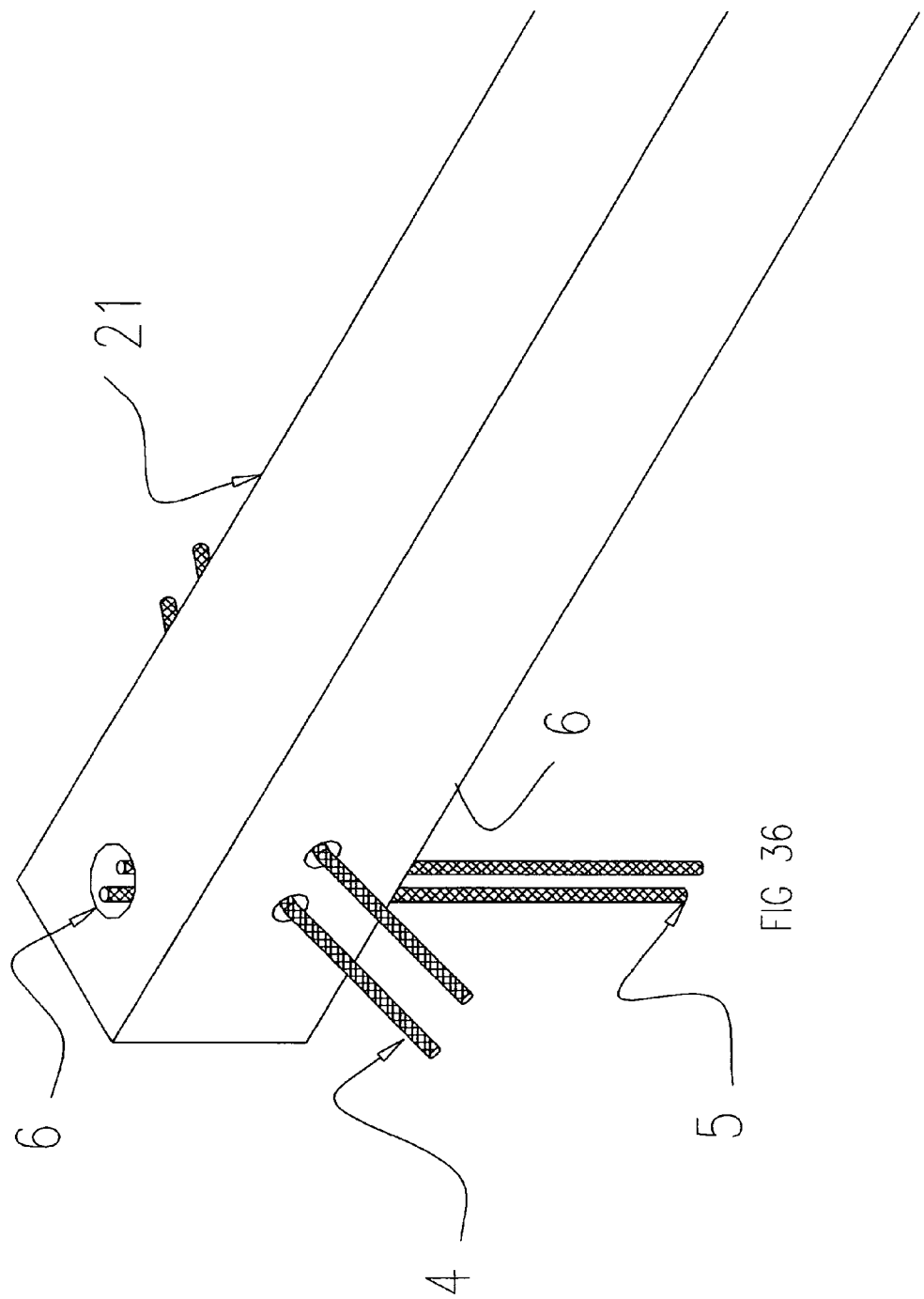
Figure 38:
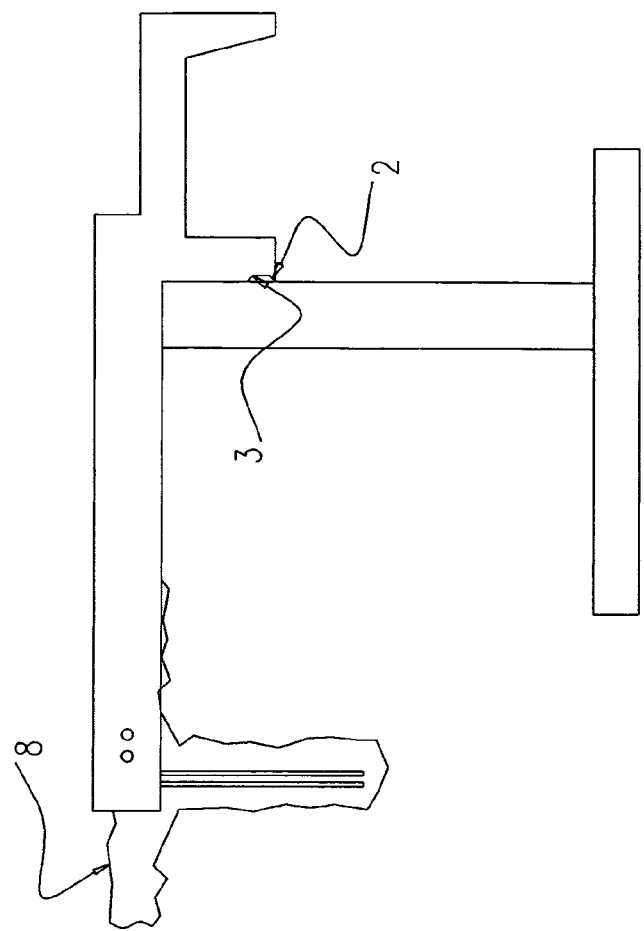
Figure 37:
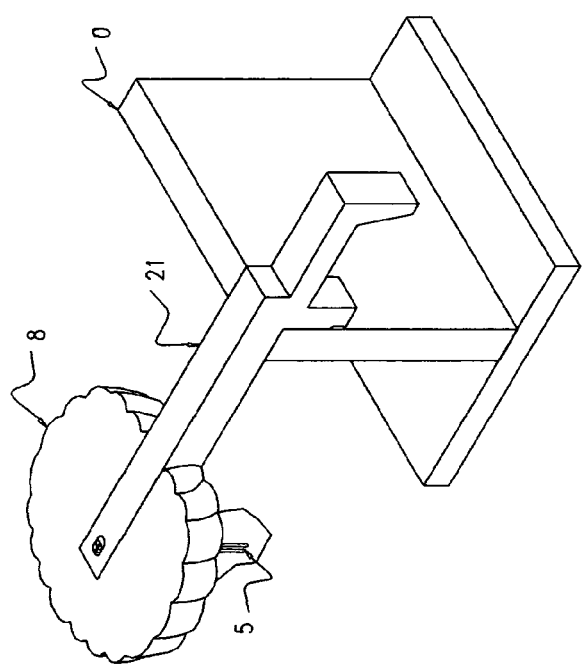
Figure 40:
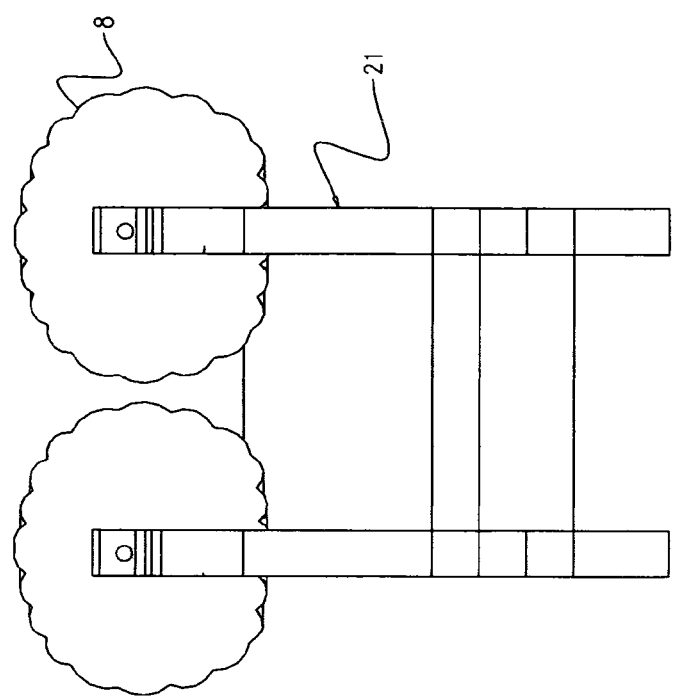
Figure 39:
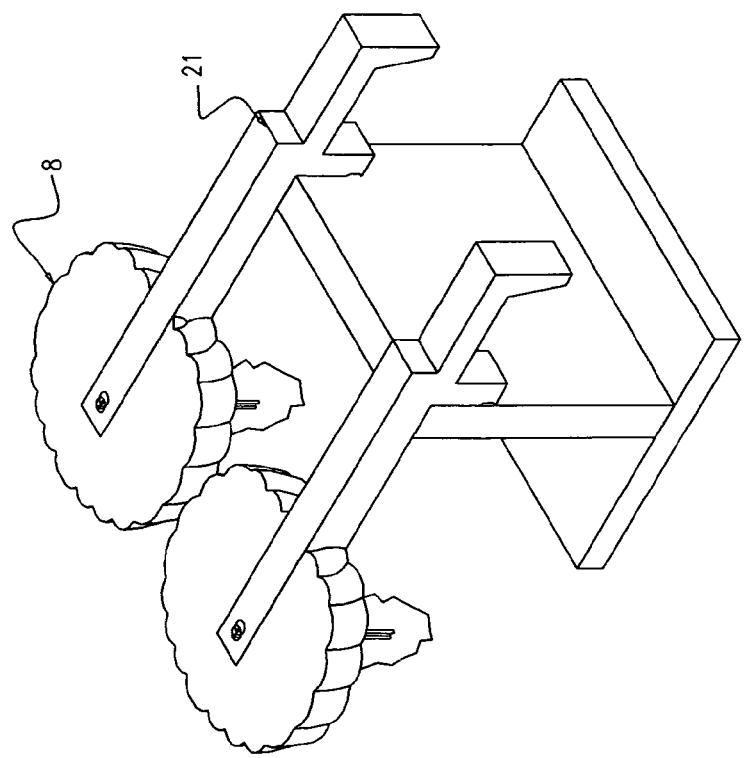
Figure 42:
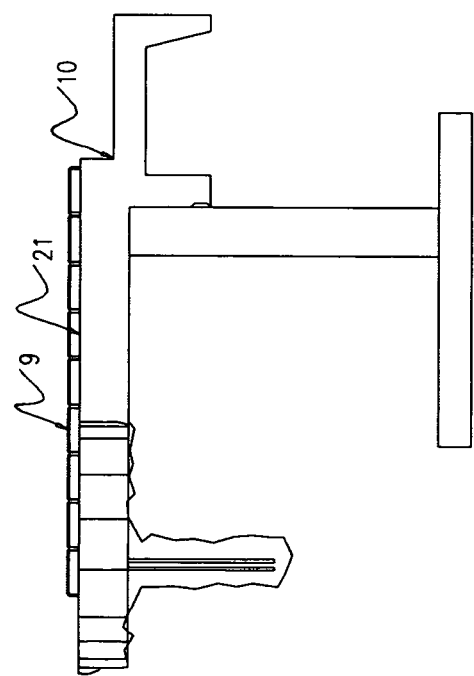
Figure 41:
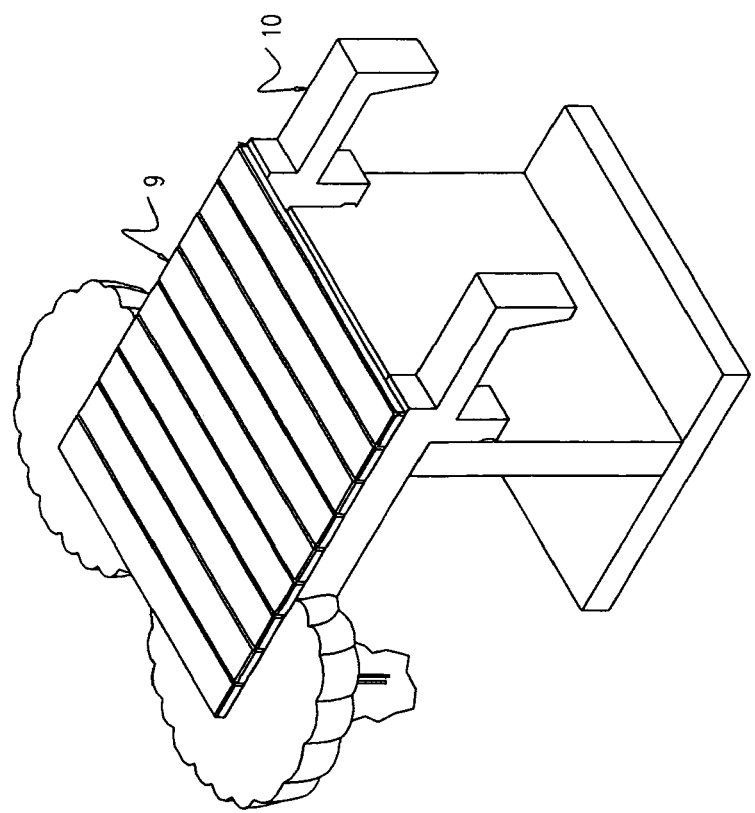
Figure 44:
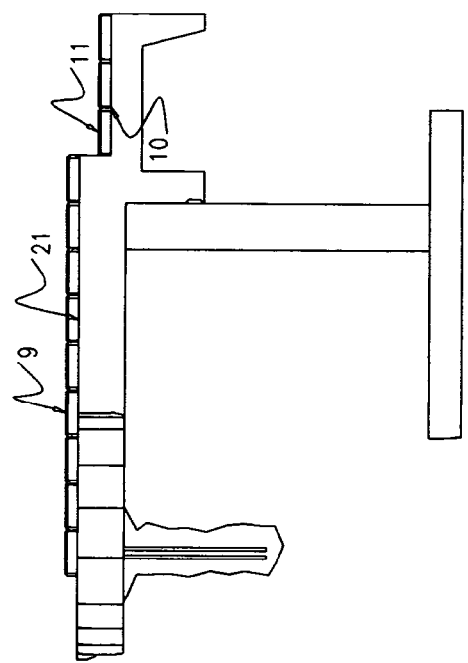
Figure 43:
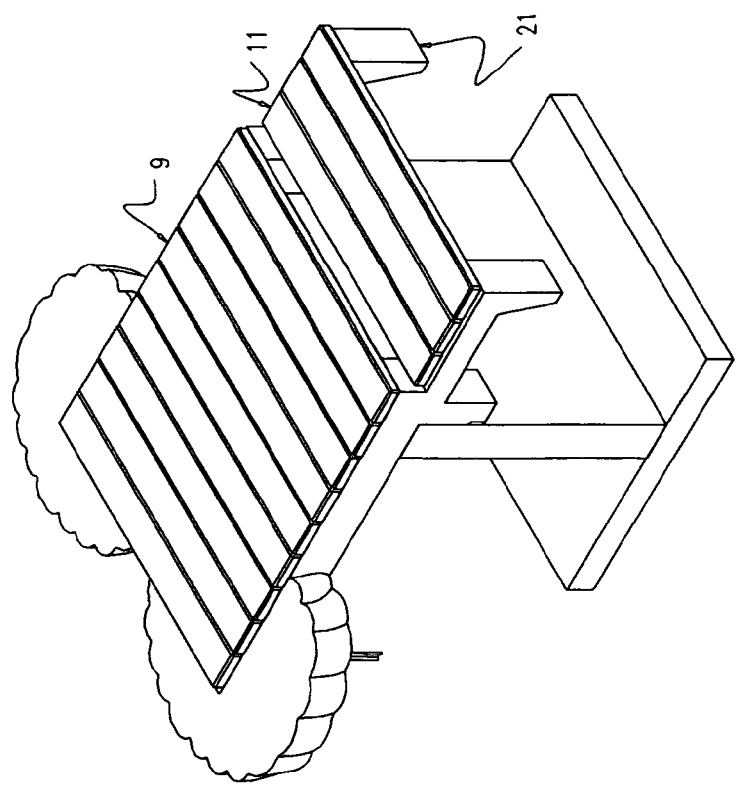
Figure 55:
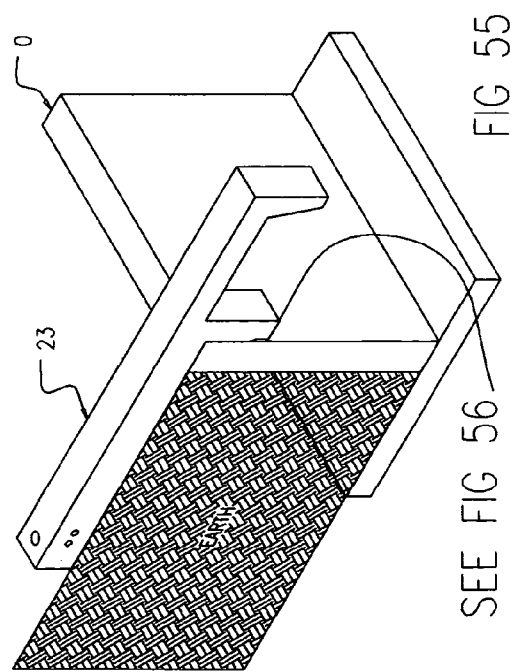
Figure 57:
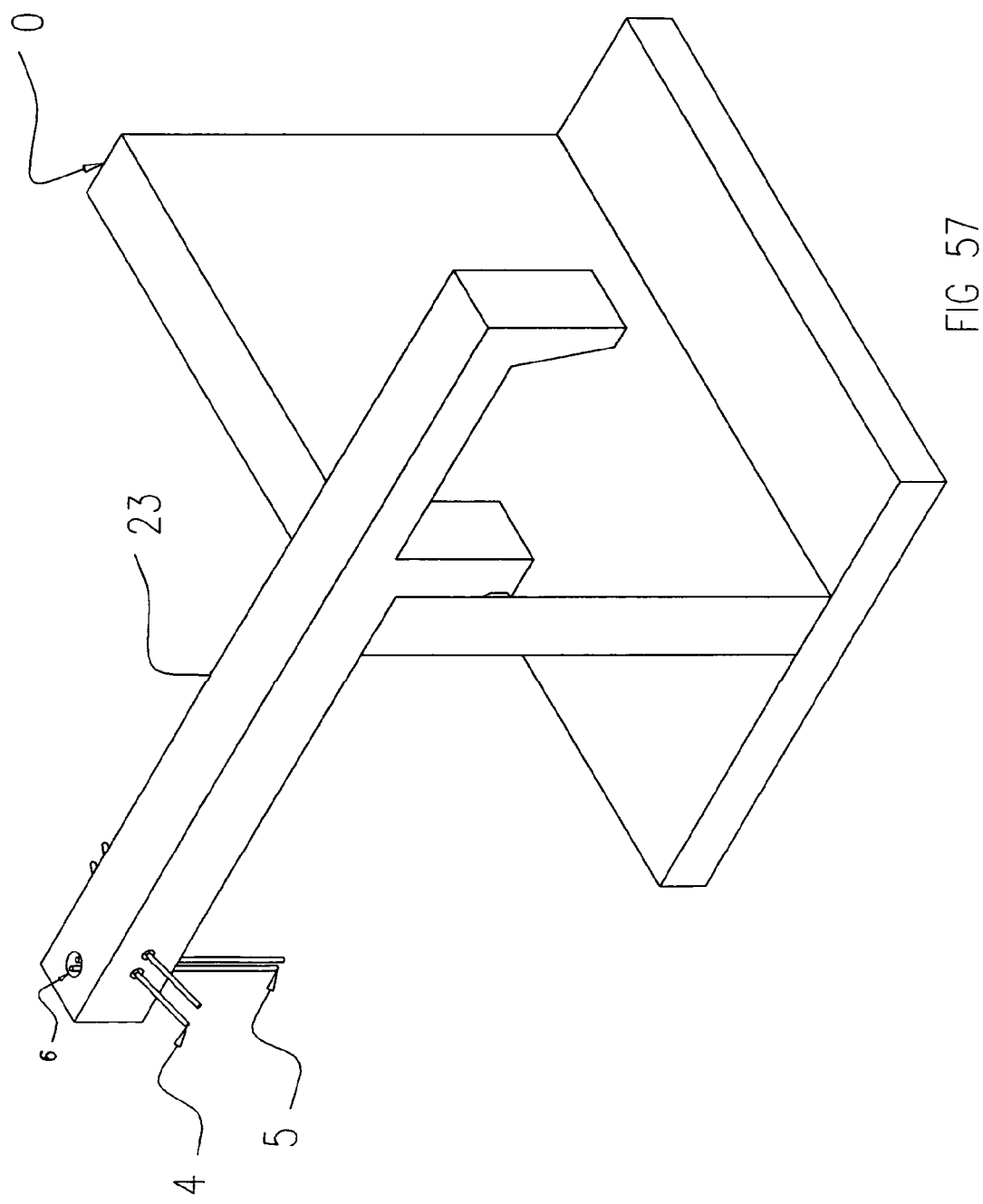
Figure 60:
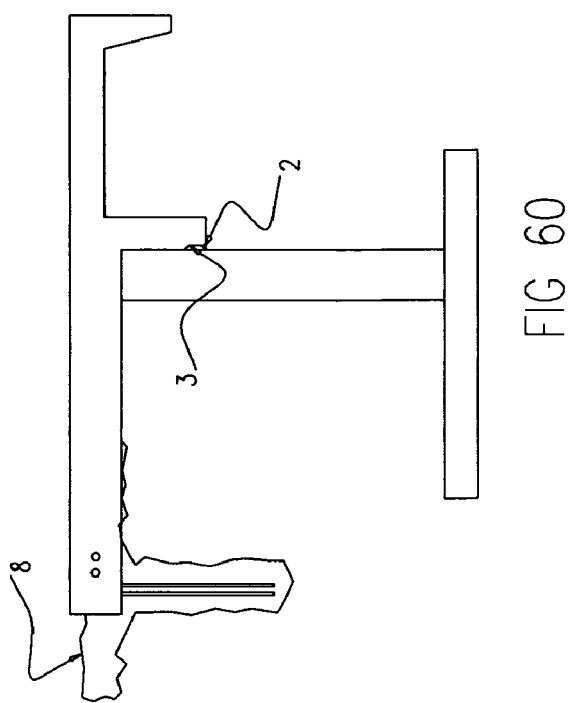
Figure 59:
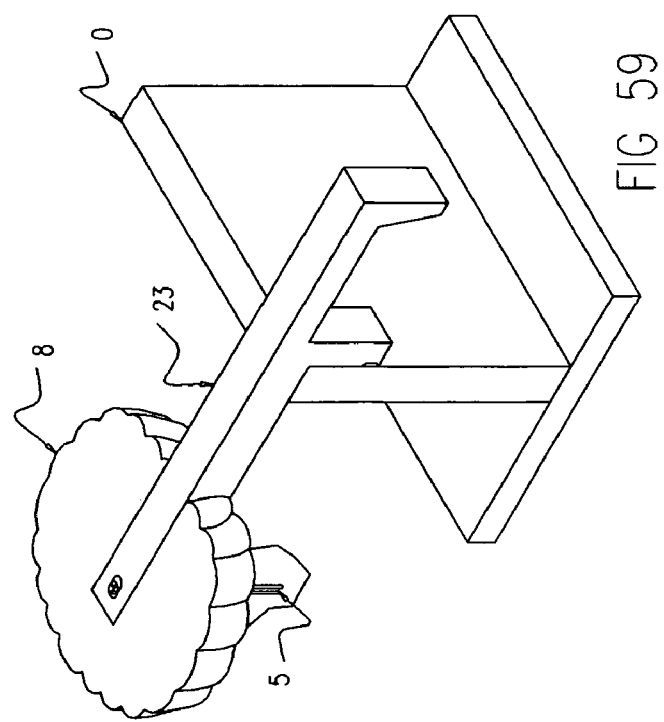
Figure 62:
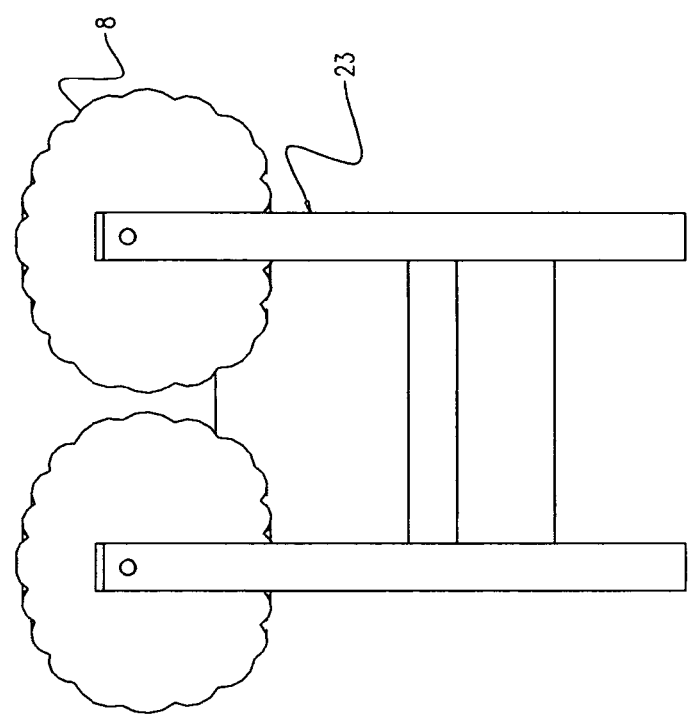
Figure 61:
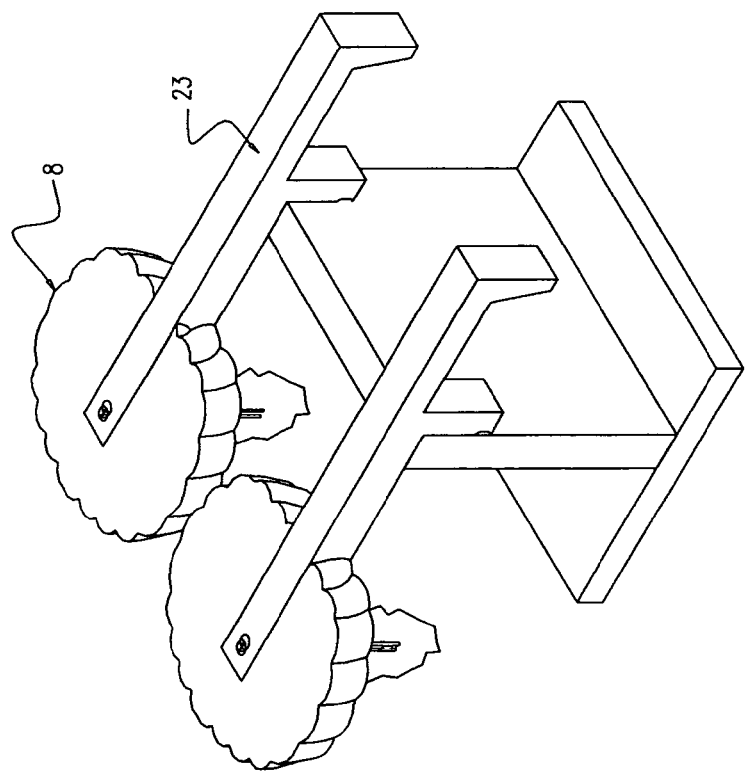
Figure 64:
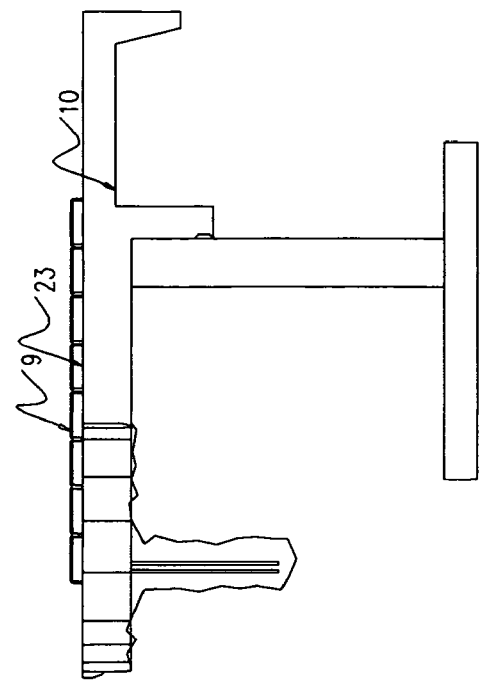
Figure 63:
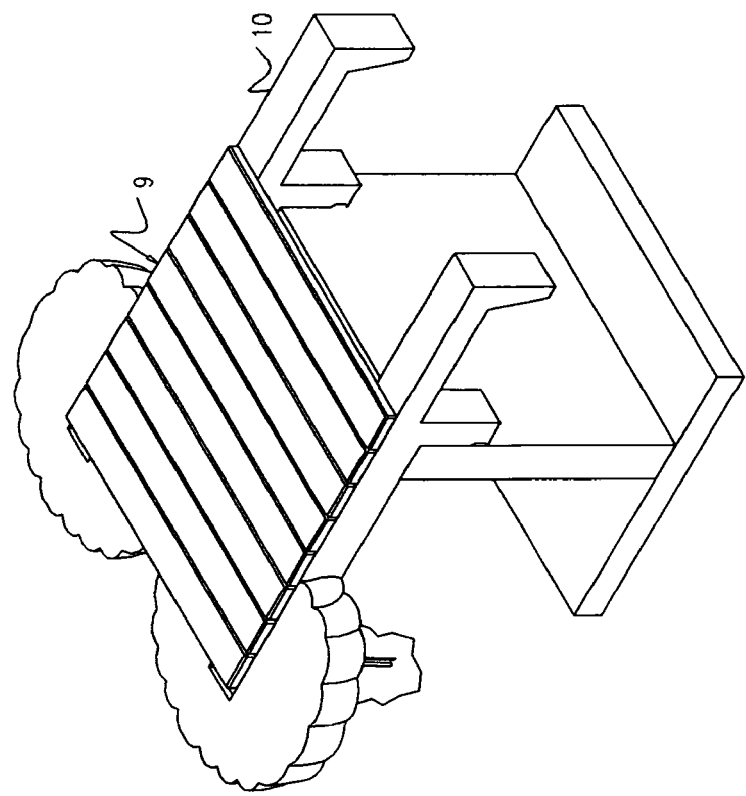
Figure 66:
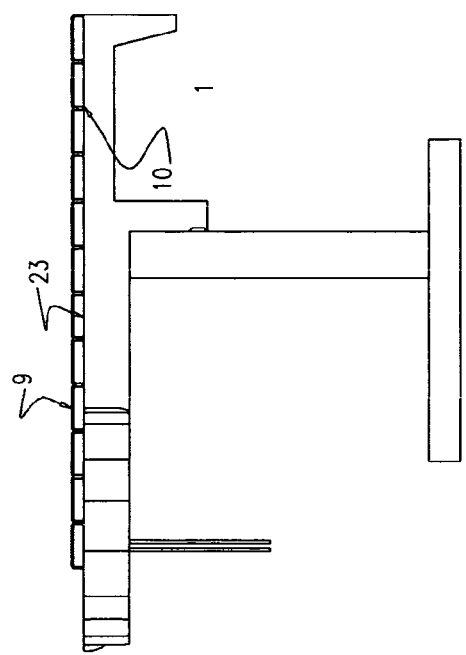
Figure 65:
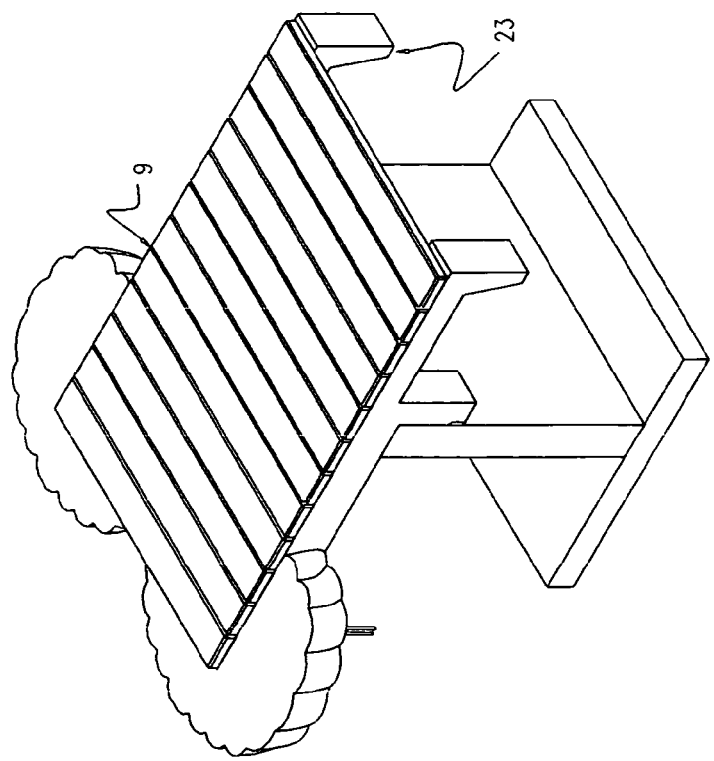

Embodiments are shown in FIG. 9, FIG. 33 and FIG. 55 with solely a cantilever beam as the structure, using the dead-weight of the beam for support. The inland end of the beam may be made bigger and heavier than the water end and thus support the cantilever beam extending out over the water's surface. Again referring to the Figures, the assembly and fabrication (making) of the preferred embodiment of the invention will be described in detail. The system is assembled and fabricated from standard materials and methods now used in the appropriate industries. Typically, the system is a pre-cast concrete beam, slab(s) and step(s) (alone or in combination) solidly connected to the each other to form a body. The body may be solely at least one rigid horizontal cantilever beam member of sufficient weight, strength, length, width and depth to accomplish support of the weight of at least an average or above average person. This embodiment uses only the dead-weight of the cantilever beam to support the water end projecting out over the water's surface. The optional dock is typically at least one pre-cast concrete slab horizontal member directly (or indirectly) bearing on the beam of sufficient strength, length, width and depth to accomplish support of the weight of at least an average or above average person. The optional step(s) are typically at least one rigid horizontal member of sufficient strength, length, width and depth to accomplish support of the weight of at least an average or above average person. Optionally, the steps may be made of slip-resistant design integrated into the top surface of the step(s). Or, a slip-resistant finish may be applied to the top surface of the step(s). Typically, the optional attachment means employed for attaching the system to the earth and sea wall is sufficient to accomplish support of at least the weight of an average or above average person. The preferred optional earth attachment means are reinforcing rod anchors horizontally and optionally vertically to anchor each section and poured into place with concrete at the site for support. The system is typically fabricated from pre-cast concrete, formed using conventional pre-cast techniques such as forming, pouring, cutting, smoothing, curing, removing the forming and polishing or finishing. The system is shown with its design, functional aspects and relationship of components in scalable form in all of the drawings combined. The openings in the system allow for wave action to dissipate without undue stress created on the system or integrated sea wall. Or, in another embodiment, an optional pre-cast sea wall is first placed at the shoreline, backfilled and then used for support for the deck, dock-step and dock components, alone or in combination. All of the inventor's shop drawings, notes, specifications, working drawings, plans, manuals and all other related printed and written documents are hereby incorporated herein by reference To make the system in the preferred embodiment and best mode, it is formed by the manufacturer in the appropriate shaped forms. The entire system uses two (2) basic components, a cantilever beam and slab, only one (1) of which is necessary (the cantilever beam) for the invention to be made and used. Another embodiment uses solely one (1) component, a straight-cantilever beam 23 of sufficient strength, weight, length, width and height (or depth) to be used as a pier over water without pillars (vertical pilings) as shown in FIG. 59 and FIG. 60. Another embodiment uses solely one (1) component, a drop-cantilever beam 21 of sufficient strength, weight, length, width and height (or depth) to be used as a pier over water without pillars (vertical pilings) as shown in FIG. 37 and FIG. 38. Another embodiment uses solely one (1) component, a cantilever Z beam 1 of sufficient strength, weight, length, width and height (or depth) to be used as a pier over water without pillars (vertical pilings), as shown in FIG. 13 and FIG. 14.

The embodiments of solely one cantilever beam are very useful at areas such as commercial marinas that charge boats to moor in "boat slips" as they are known in the industry. At commercial marinas, each front-foot of seawall is very valuable real estate, since it is income producing by charging money for boats to tie-up thereon. Using a plurality of solely one cantilever beams about two (2) or three (3) feet wide with an appropriate spacing between them would allow for "catwalks" to be between each boat in the open spacing between the beams to maximize the valuable seawall frontage and maximize the marina income. The cantilever beam(s) may be any shape or size and is not limited by the previous or following description. The slab(s) may be any shape or size and is not limited by the previous or following description.

A cantilevered Z beam is the first component of the preferred embodiment. The cantilever Z beam(s) are a modified Z-shape as depicted in FIG. 1. FIG. 2 shows a top view of the beam. Typically, the cantilever Z beam is about 12 inches wide, extends about 10 feet back from the sea wall onto the land (inland end), steps down twice about 8 inches each step and projects outward over the water's surface about 5 feet (water end). If designed and built with sufficient dead-weight on the inland end, the beam alone may function in one embodiment of the invention. Typically the steel reinforcement bars are industry standard rebars. Alternately, steel "I" beam, stainless steel rods, epoxy coated rebar, galvanized rebar, steel or fiberglass mesh or any other suitable reinforcement means can be used.

Optionally, the second component is a slab. FIG. 3, FIG. 4, FIG. 5, FIG. 27, FIG. 28, FIG. 29, FIG. 49, FIG. 50, and FIG. 51 show the slab details. The slab is modular in nature and typically 8 feet long, 1 foot wide and 3 inches deep as shown in the above-referenced drawings. Typically the steel reinforcement bars are industry standard rebars. Alternately, steel "I" beam, stainless steel rods, epoxy coated rebar, galvanized rebar, steel or fiberglass mesh or any other suitable reinforcement means can be used. The optional slab is used in modular units on the top surface of the cantilever Z beam (or drop-cantilever beam or straight-cantilever beam or any other shape cantilever beam) to build the optional patio (deck) surface over the shoreline, the optional steps and the optional dock projecting over the water's surface.

Figure 30:
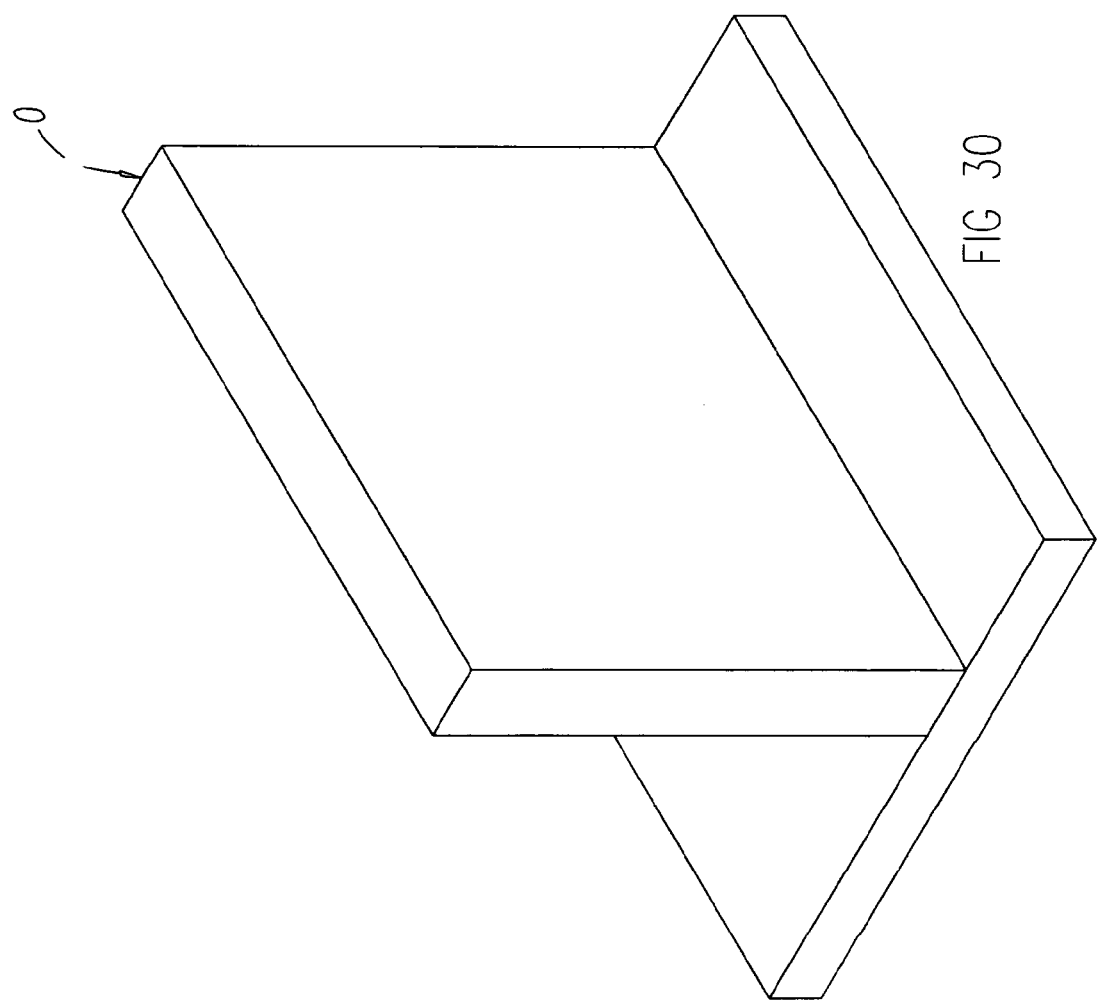
Figure 31:
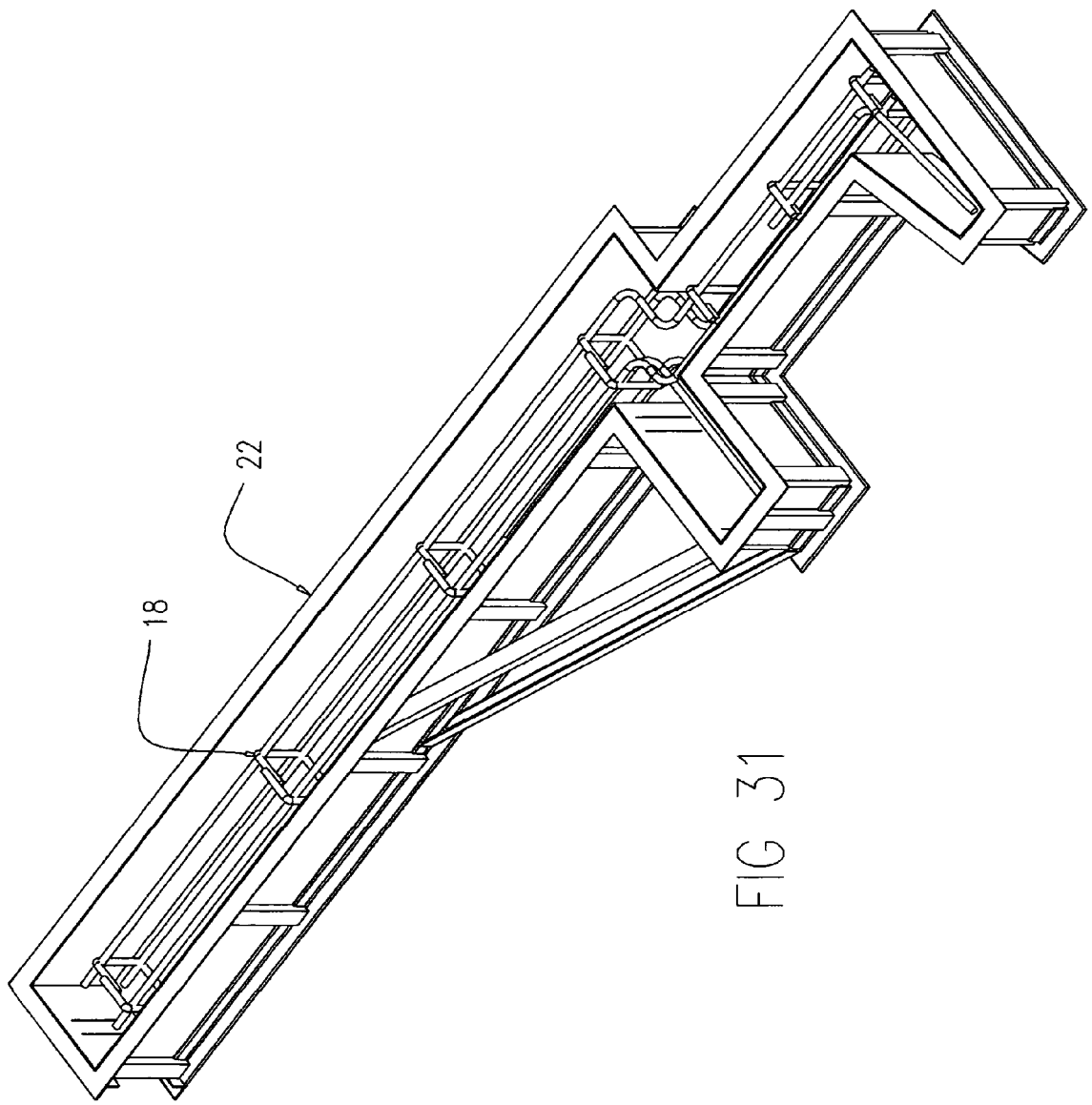
Figure 52:
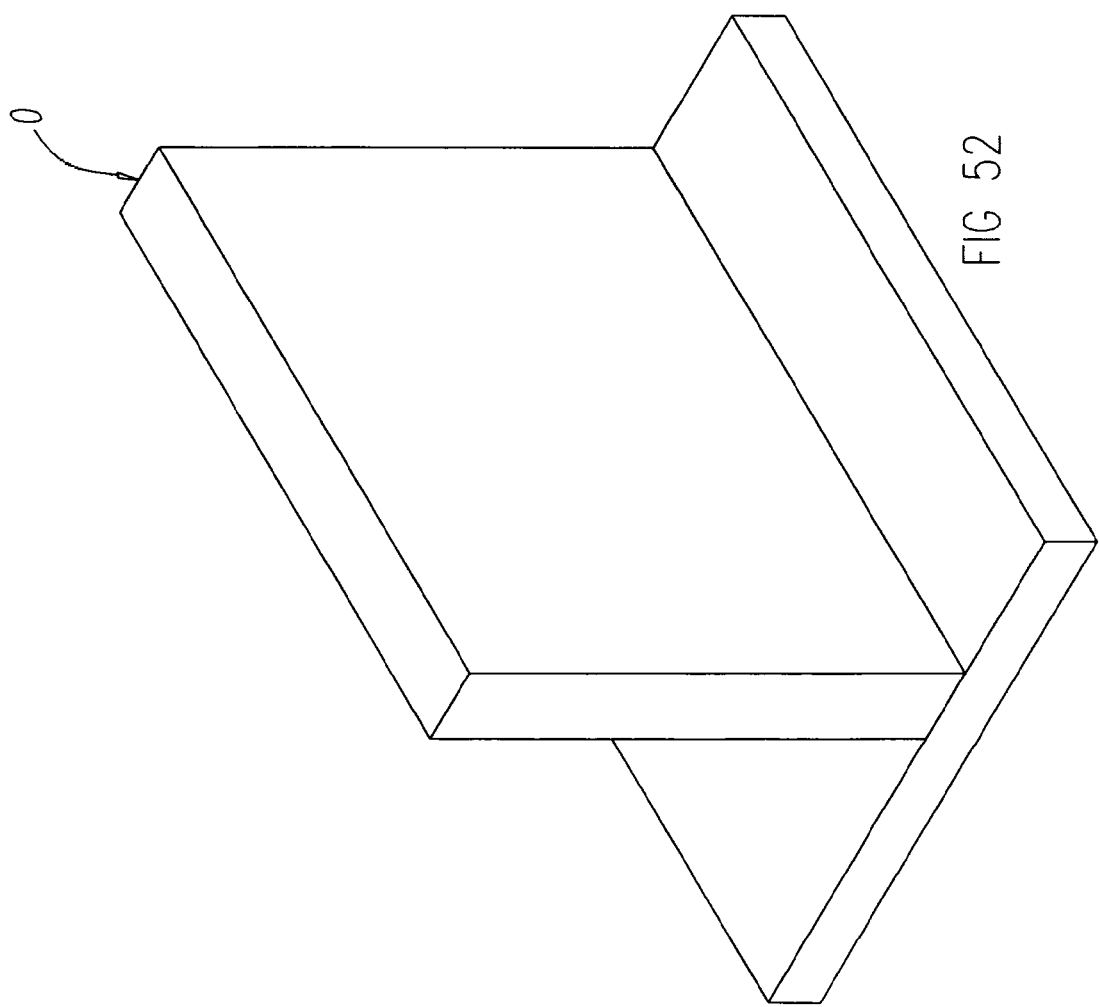
Figure 53:
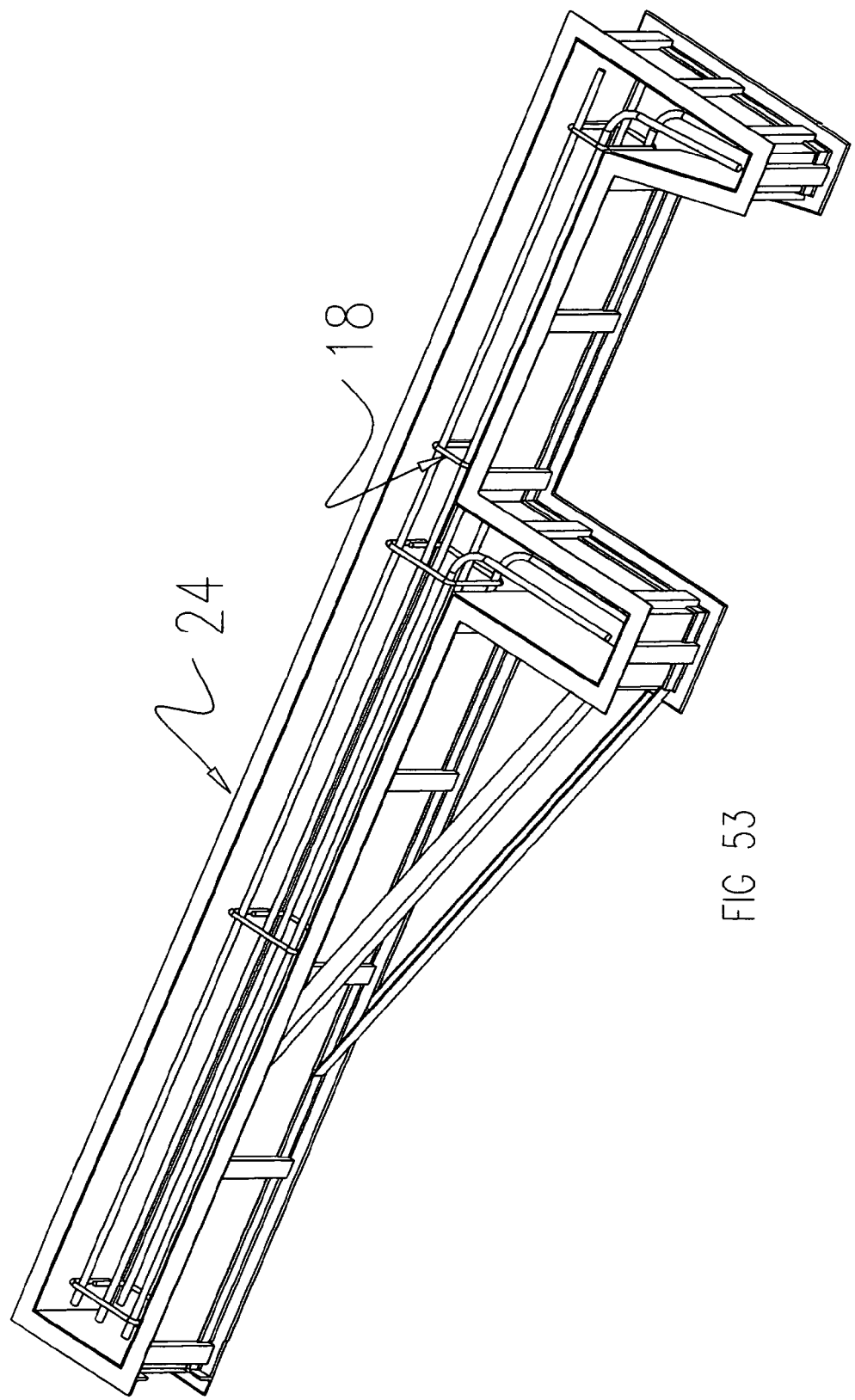

FIG. 6, FIG. 30, and FIG. 52 show the optional pre-cast sea wall is typically 6 feet tall, 1 foot deep (or sloped with a variable depth), 20 feet wide, and on an integrated pre-cast foundation slab about 4 feet back into the earth-side of the sea wall and 1 foot into the water-side of the sea wall. Typically the steel reinforcement bars are industry standard rebars. Alternately, steel "I" beam, stainless steel rods, epoxy coated rebar, galvanized rebar, steel or fiberglass mesh or any other suitable reinforcement means can be used.

Ideally, the two basic components (cantilever beam and slab) are fabricated in an PreCast Concrete Association of America (PCAA) certified pre-cast plant using approved standards for reinforcing, concrete mix designs, casting procedures, quality control, etc. and complying with all local codes and American Concrete Institute (ACI)-318 requirements. All related manuals, specifications and other printed documents generated by PCAA and ACI are hereby incorporated by reference.

Figure 8:
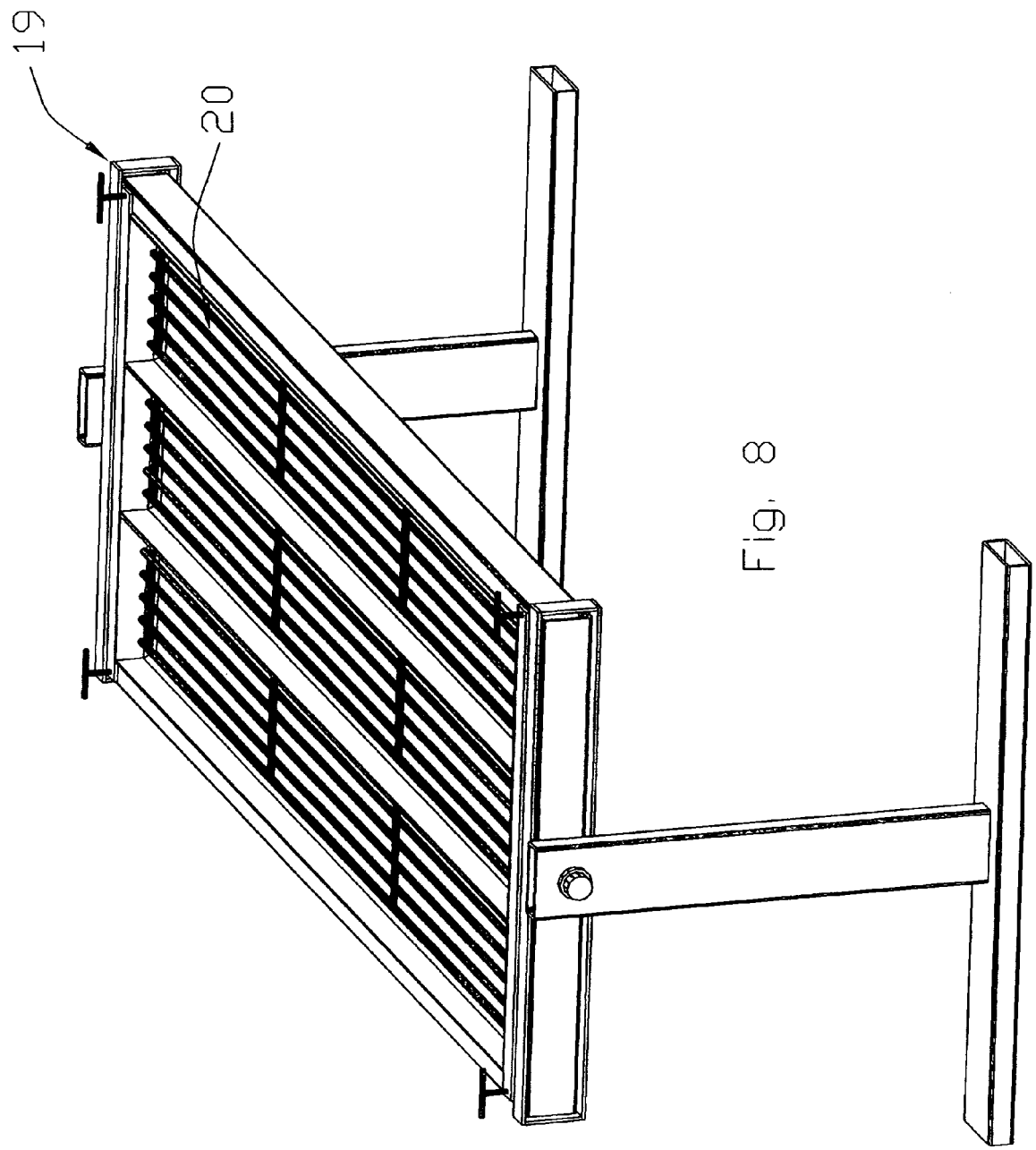
FIG. 8 shows the pre-cast concrete gang mold for mass production (3 at a time) of the slabs with reinforcement bars therein, on tilt table and ready to pour concrete for manufacture.
Figure 32:
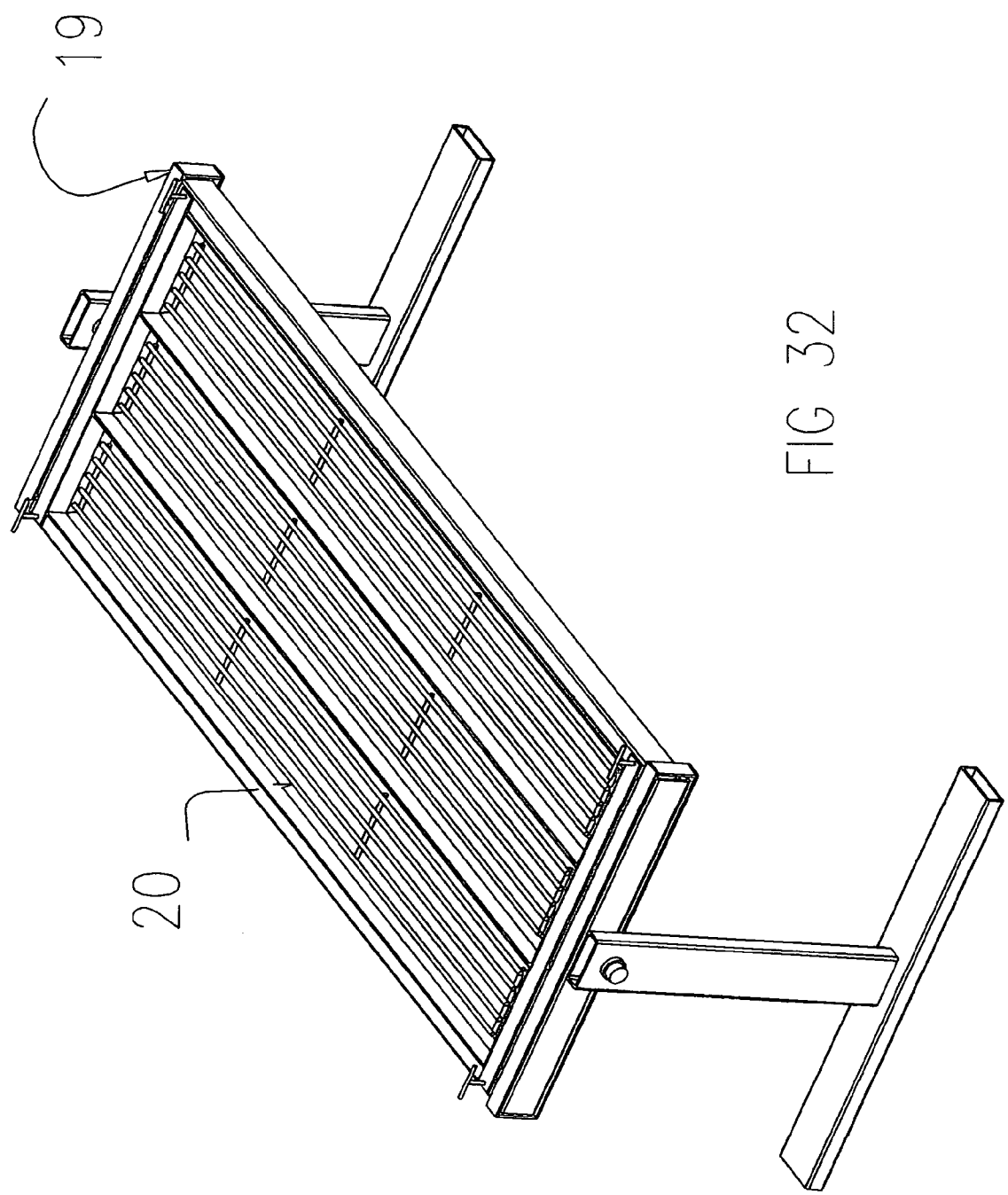
Figure 34:
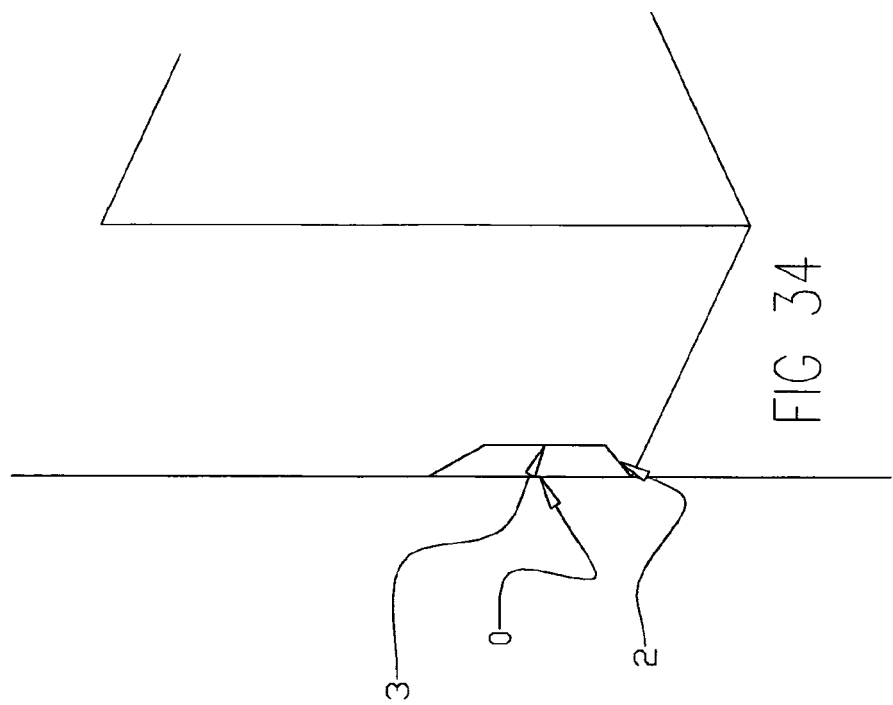
Figure 54:
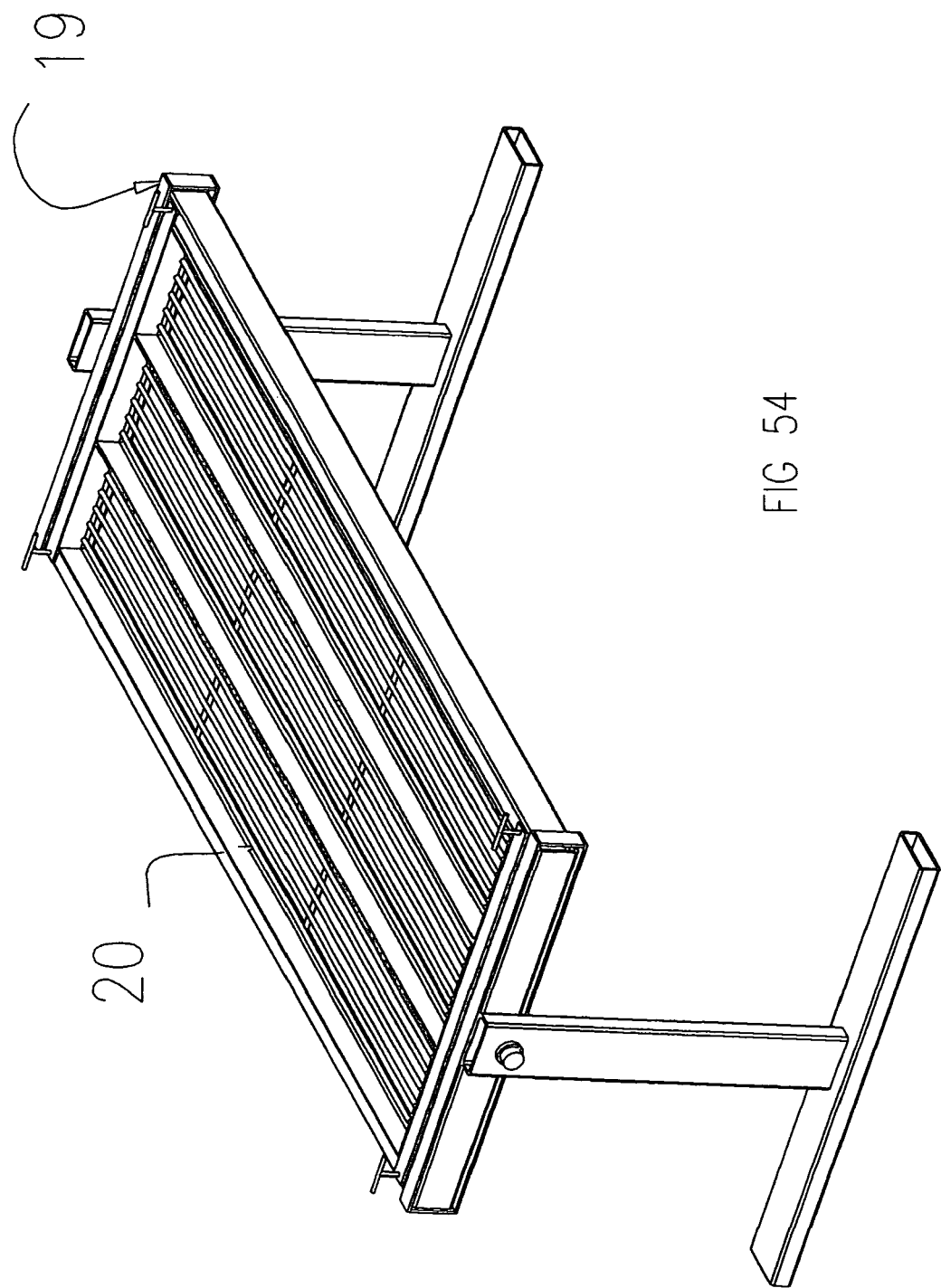
Figure 56:
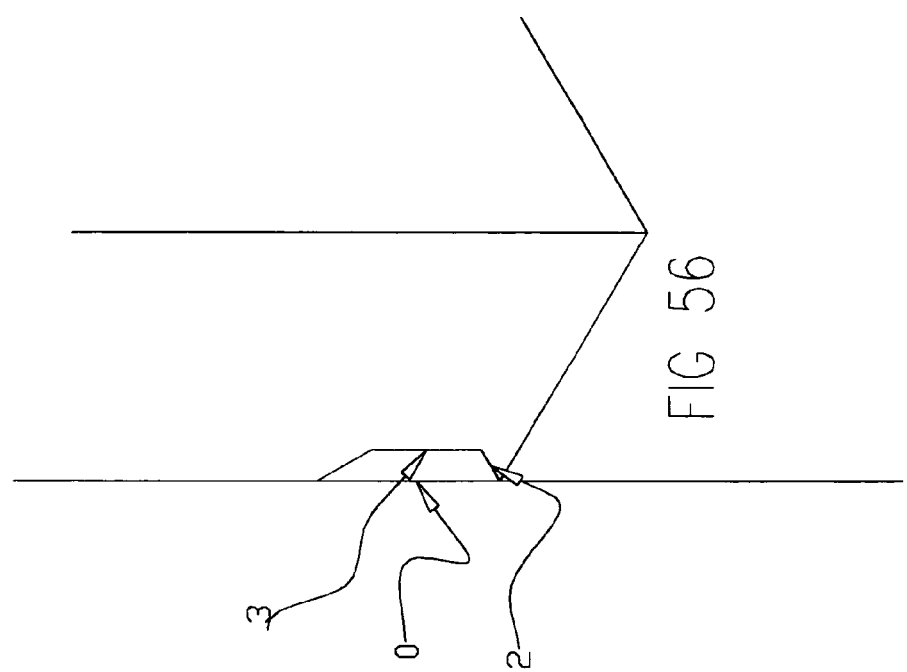

To make the invention, appropriate steel angle perimeter molds, pan molds and gang form molds (for mass production) in the proper dimensions, all typical in the pre-cast industry, are used on either a smooth casting surface or steel casting tilt-table. FIG. 7 shows a typical cantilevered Z beam mold 17 with rebars 18 inserted on chairs, ready to be poured with concrete. Alternately a drop-cantilever beam 21 and mold 22 may be used or a straight-cantilever beam 23 and mold 24 may be used in other embodiments. The drop-cantilever beam 21, straight-cantilever beam 23 and cantilever Z beam 1 may have an optional vertical (or nearly vertical) prong 25 if desired. As previously mentioned, the cantilever beam and associated mold may be any shape or size. FIG. 8, FIG. 32 and FIG. 54 show a typical gang form 19 with 3 typical slabs with rebars 20 on chairs in the molds, on a steel tilt-table, ready to be poured with concrete.

Typically, the concrete is 4,000 PSI and chemicals may be added for hardening, curing and chloride (salt) resistance; these chemicals are well known in the industry and to an average person skilled in the art. In best mode, the concrete cures in 24 hours, enabling the forms of the slab(s) and cantilevered beam(s) to be stripped and the components stored about 20 days for final curing. After the components are fully cured, they are loaded onto a suitable truck (typically a flat-bed). A typical unit of the pre-cast dock step system contains (2) two cantilevered Z beams and (14) fourteen slabs spanning between the beams. These components will build a system with a 9 feet long by 8 feet wide deck on the land-side of the shoreline, two 12 inches long by 8 feet wide steps (with 8 inch risers) leading down to a 3 feet long by 8 feet wide dock protruding over the water's surface. For wider decks, steps and docks, more of the above-referenced units are constructed on either side of the first unit at the appropriate spacing. The above-referenced dimensions are illustrative only and used merely as examples, as the system may be made in any and all dimensions (sizes) desired by the manufacturer and user. For example, the user may desire only 10% of the total system to cantilever over the water. Or, the user may desire 20% of the total system to cantilever over the water. Or, the user may desire 39% of the total system to cantilever over the water.

Then one, some or all of the above-referenced components are trucked to the site at the shoreline where the system is to be erected. The site is prepared by excavating or adding clean dirt fill, as needed, to provide a level earth surface inland, typically 9 feet minimum from the sea wall.

Figure 10:
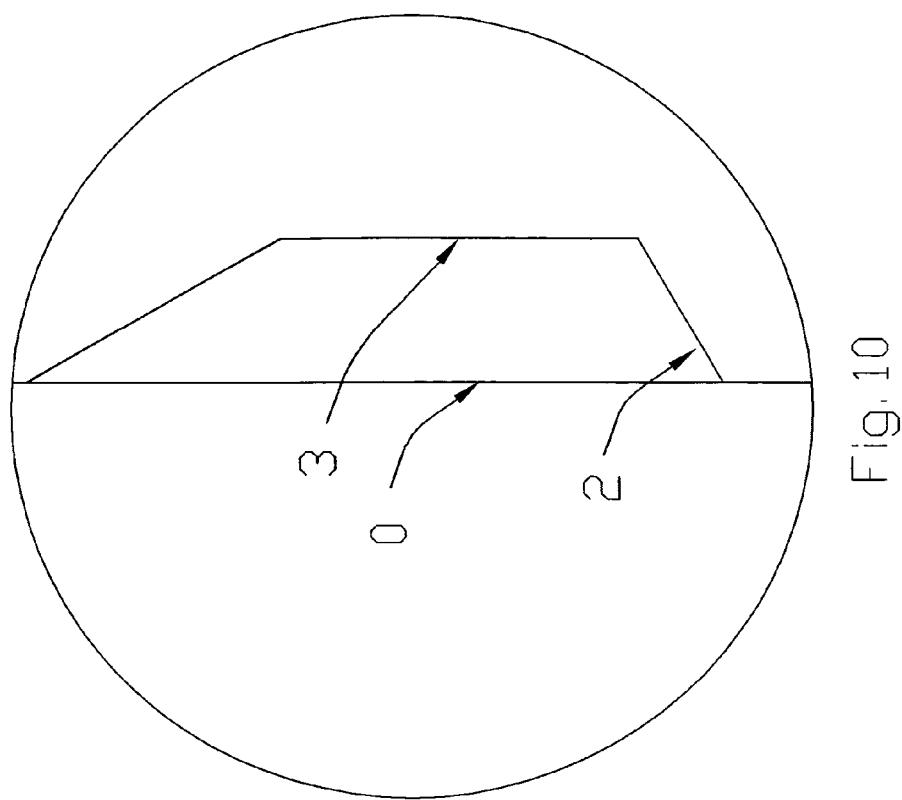
FIG. 10 depicts a close-up detail of the heel of the beam and wedging against the side of the sea wall.

Referring now to FIG. 9, the first cantilevered Z beam 1 (or drop-cantilever 21 or straight cantilever beam 23) is unloaded from the truck with a fork-lift, suitable crane or manpower and set onto the top of the existing sea wall (or optional pre-cast sea wall 0). As previously described, this could be one finished embodiment of the invention if desired by the user. FIG. 10 shows the heel 2 of the cantilevered Z beam 1 against the sea wall with optional wedging 3 (typically polychloride vinyl or similar mastic or hydraulic cement or other suitable wedging material) in the heel 2. The wedging 3 provides a cushion for both load bearing and to displace bending stress (moment) to the water-side surface of the sea wall from the cantilever beam dead-weight behind the sea wall.

Next, as shown in FIG. 11, FIG. 12, FIG. 35, FIG. 36, FIG. 57 and FIG. 58, optional horizontal rebar(s) 4 and optional vertical rebar(s) 5, if desired, are placed in the pre-formed holes 6 in the inland end 7 to be used as an optional earth anchor. The optional earth anchor is shown in FIG. 13, FIG. 14, FIG. 37, FIG. 38, FIG. 59 and FIG. 60 by excavating or forming a deadman 8 about 3 feet in diameter and 1 foot deep around the inland end 7 of the cantilevered Z beam 1 and poured solidly with concrete (typically 2,500 PSI) and allowed to cure, which encases completely the optional horizontal rebar(s) 4 and optional vertical rebar(s) 5 in the pre-formed holes 6. The optional deadman 8 prevents uplift at the inland end 7 of the cantilevered Z beam 1 and helps keep the sea wall rigid and helps prevent "creep" of the sea wall due to the earth's static pressure if needed or desired.

Figure 16:
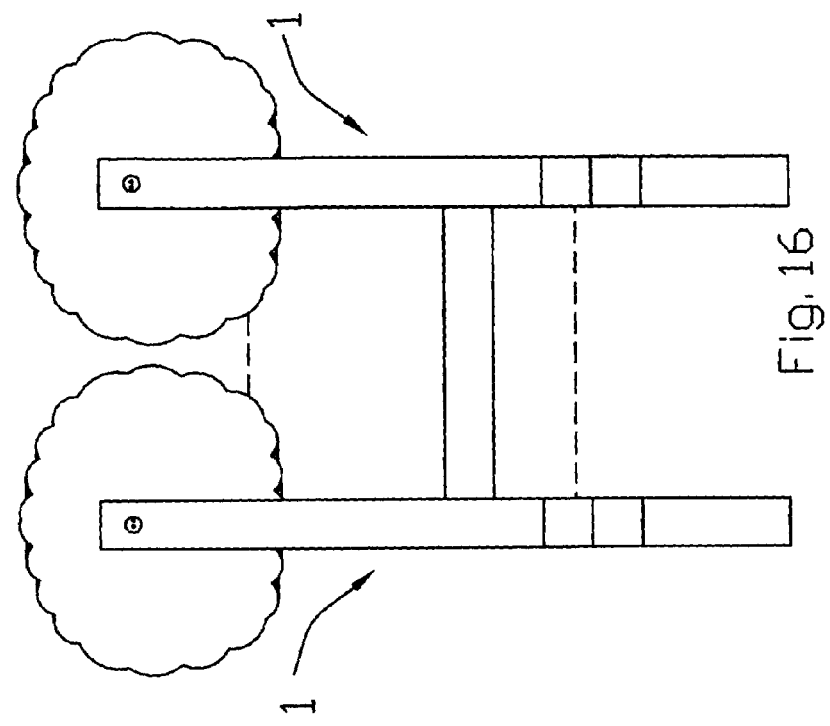
FIG. 16 depicts a top view of the partial system with the earth anchor (concrete deadman) poured in place, securing the inland side of two (2) beams.
Figure 15:
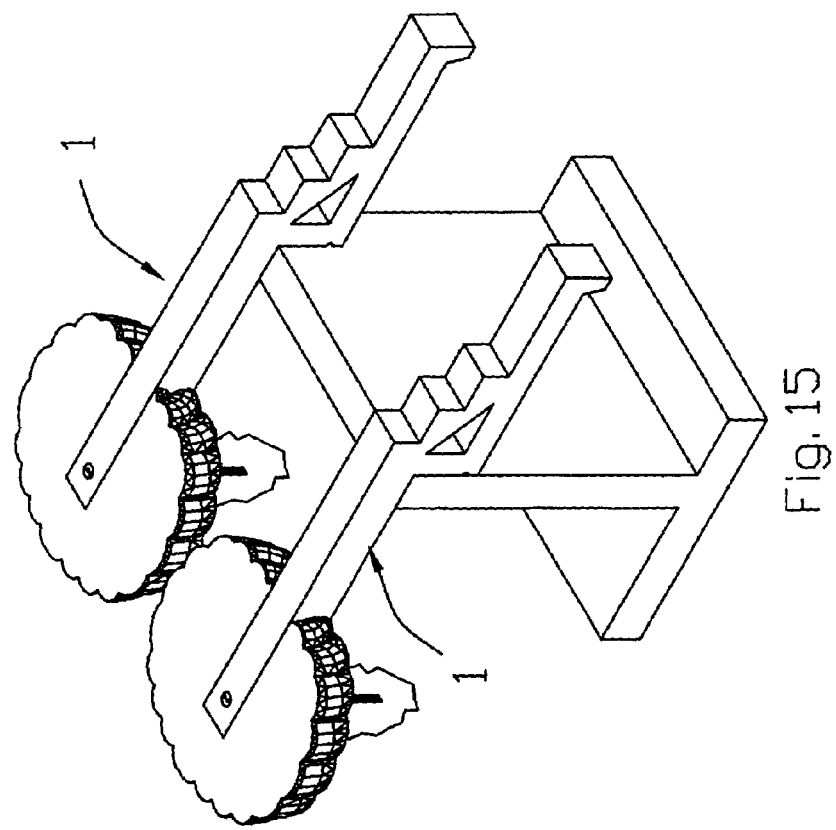
FIG. 15 depicts a perspective view of the partial system with the earth anchor (concrete deadman) poured in place, securing the inland side of two (2) beams.

The second optional cantilevered Z beam 1 is unloaded from the truck and installed in the exact same above-referenced manner as shown in FIG. 15 and FIG. 16 about 8 feet parallel to the first cantilevered Z beam 1.

Then, the optional slab(s) 9 are unloaded from the truck and placed perpendicular to and spanning between on the top surface of the inland end 7 of the first and second cantilevered Z beams 1 one at a time until (9) nine slabs are laid on the inland-side top surfaces of the first and second cantilevered Z beams 1, making the deck, a shown in FIG. 17 and FIG. 18. All slabs are integrated onto the top surface of the cantilevered Z beam(s) 1 with their dead weight and secured with appropriate adhesive mastic.

Figure 20:
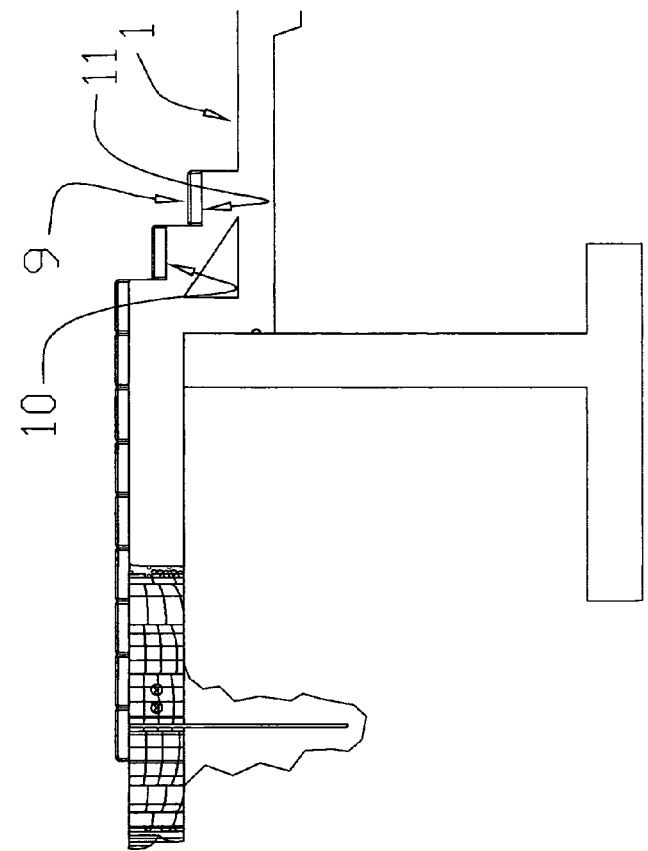
FIG. 20 depicts a side sectional view of the partial system with the deck slabs on the top surface of the inland end of the beam and step slabs integrated into the top surface of the beam.
Figure 19:
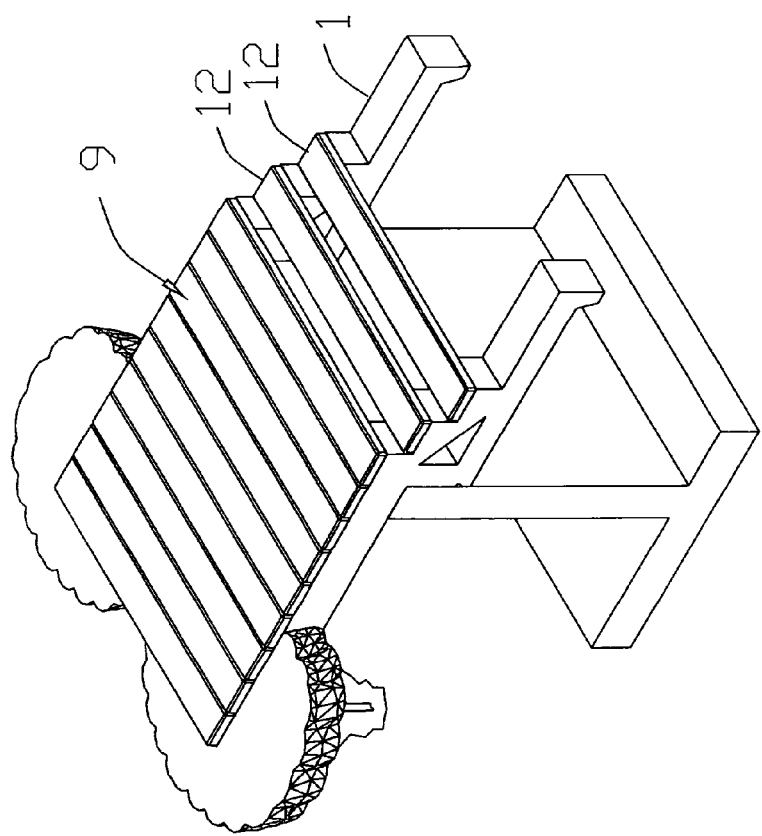
FIG. 19 depicts a perspective view of the partial system with the deck slabs on the top surface of the inland end of the beam and step slabs integrated into the top surface of the beam.

Then, (1) one slab 9 is placed perpendicular to and spanning between on the top surface of the step one 10 and (1) one slab 9 is placed perpendicular to and spanning between on the top surface of step two 11, as shown in FIG. 19 and FIG. 20, making (2) steps with 8 inch risers 12. Alternately, one slab may be centered on one cantilever beam if desired.

Next, the last (3) three slab(s) 9 are placed perpendicular to and spanning between on the top surface of the water end 13 of the first and second cantilevered Z beams 1 one at a time until the (3) three slabs are laid on the water end 13 top surfaces of the first and second cantilevered Z beams 1, making the dock, a shown in FIG. 21 and FIG. 22. The invention is completed and ready to use. Throughout this application, (s) indicates either singular or plural.

Figure 23:
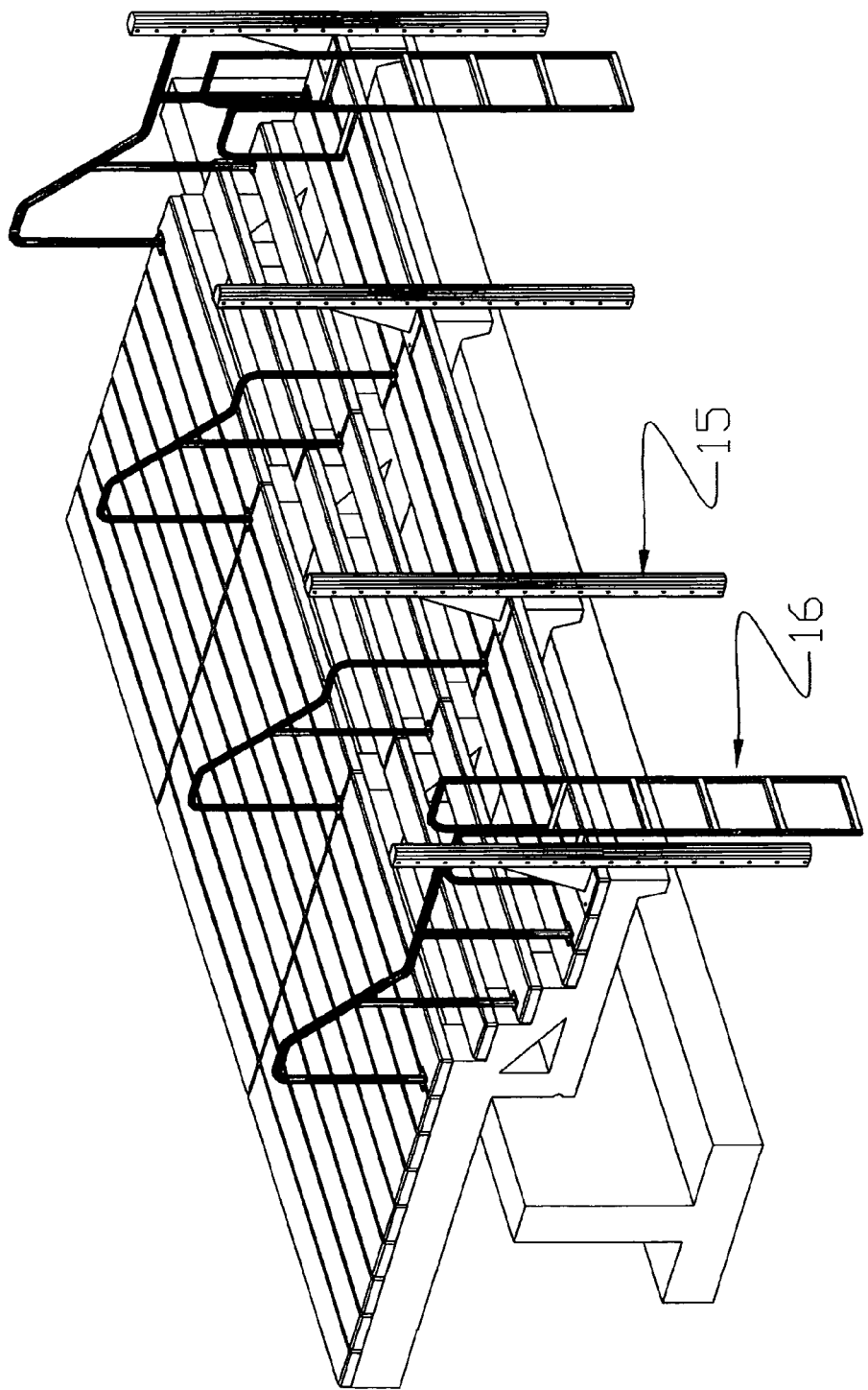
FIG. 23 depicts a perspective view of the completed deck, dock steps and dock system with the optional hand rails, boat bumpers and water access ladders integrated into the system.
Figure 24:
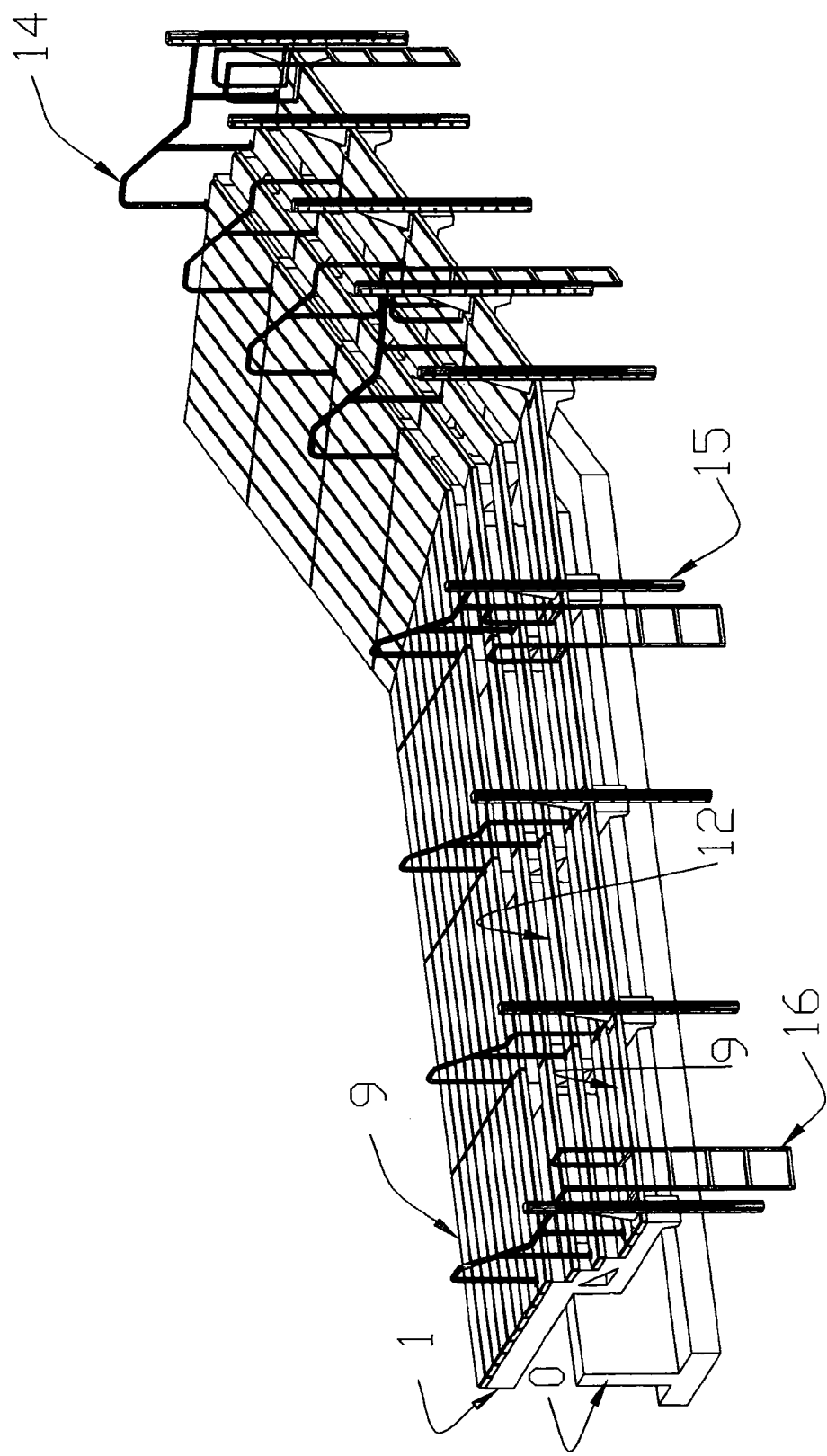
FIG. 24 depicts an alternative embodiment of the dock and dock steps system with an angled front edge at the water line (curved front edge may also be used).
Figure 45:
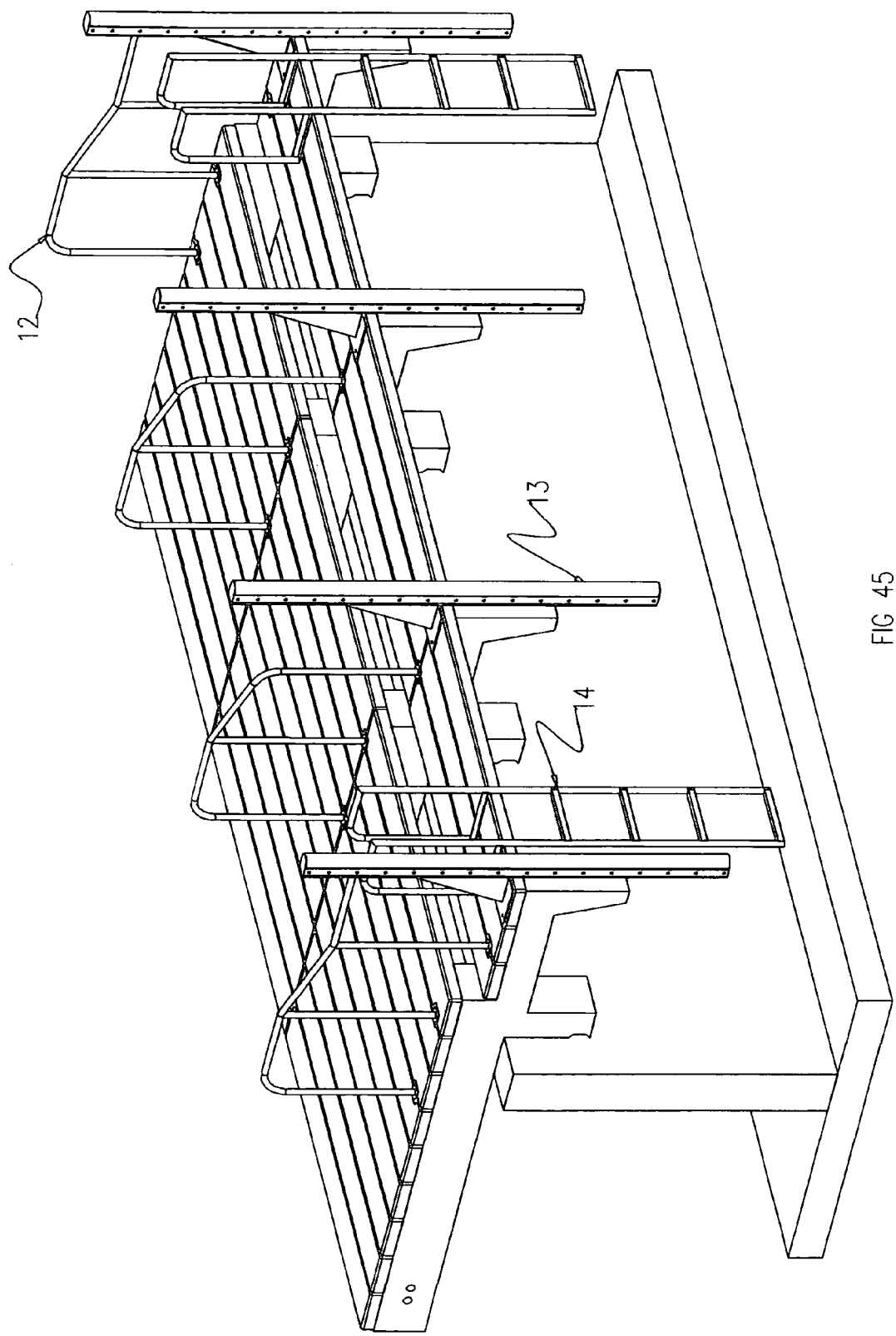
Figure 46:
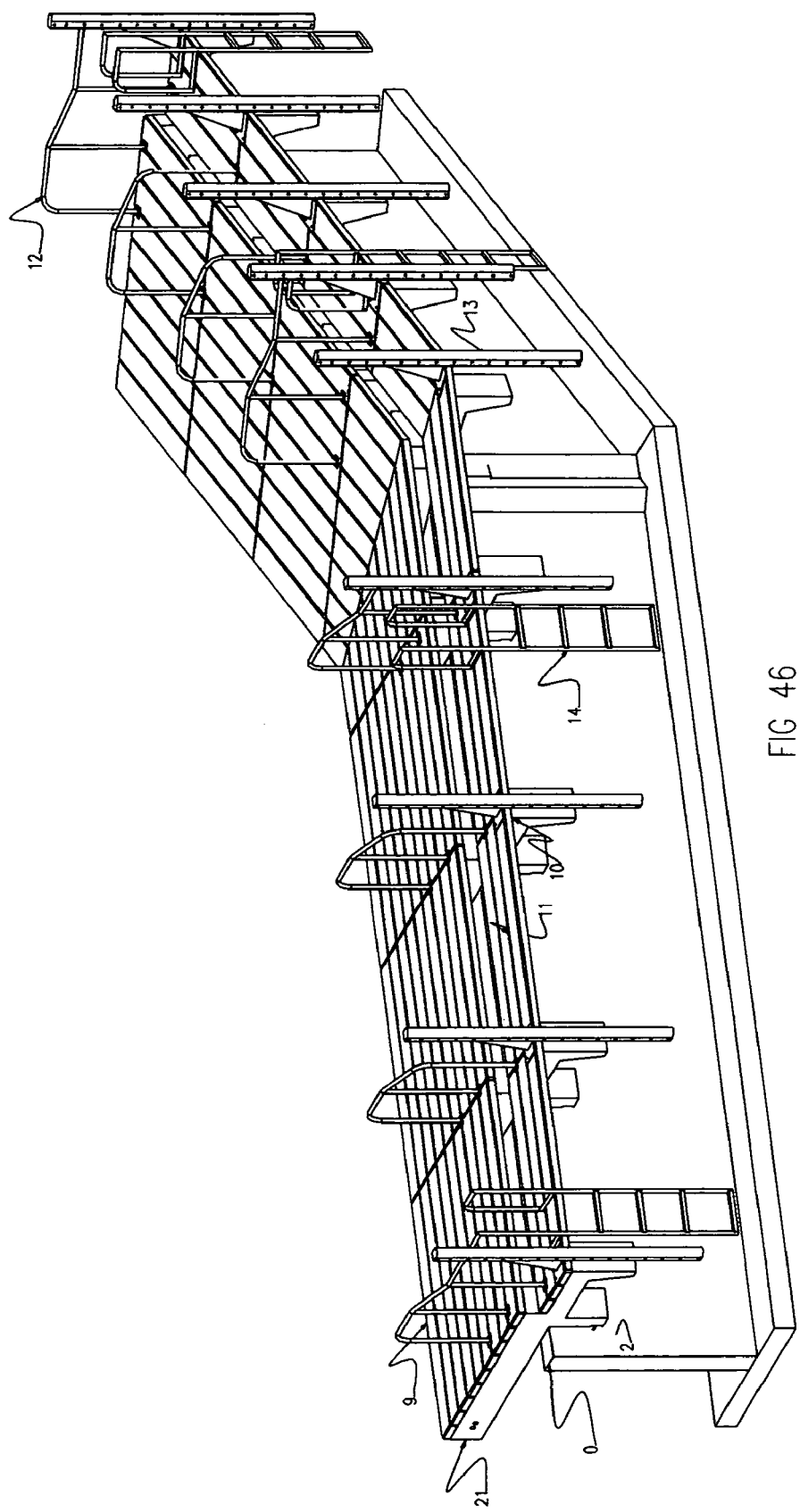
Figure 47:
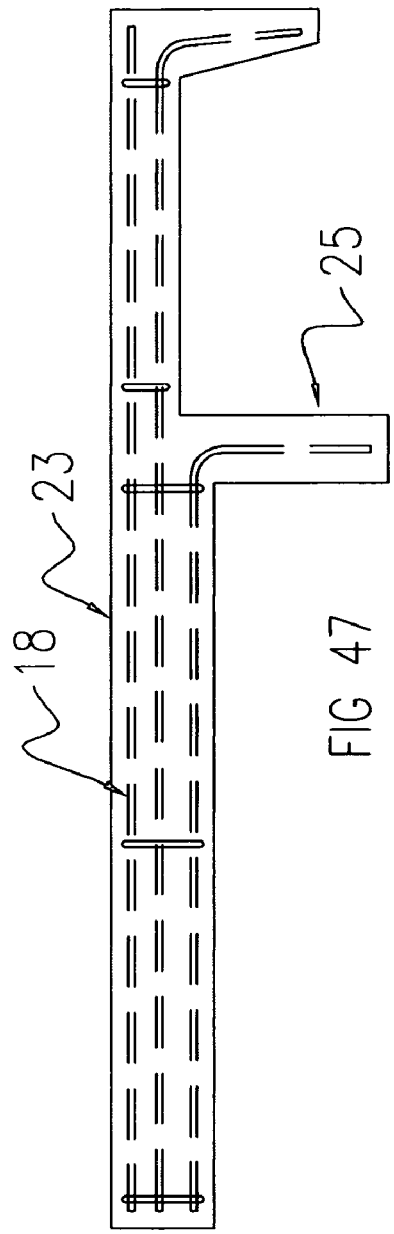
Figure 48:
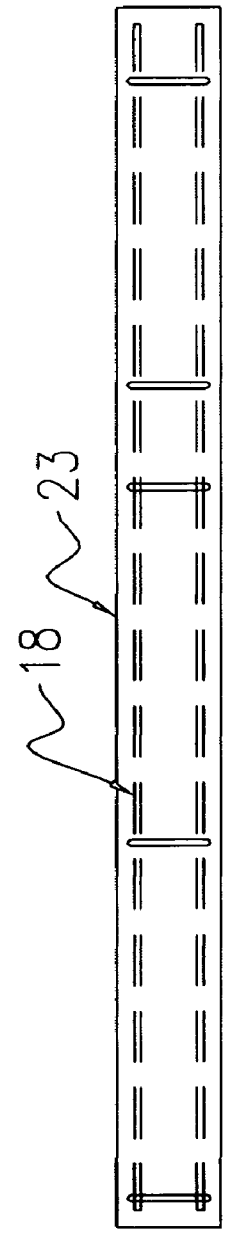
Figure 67:
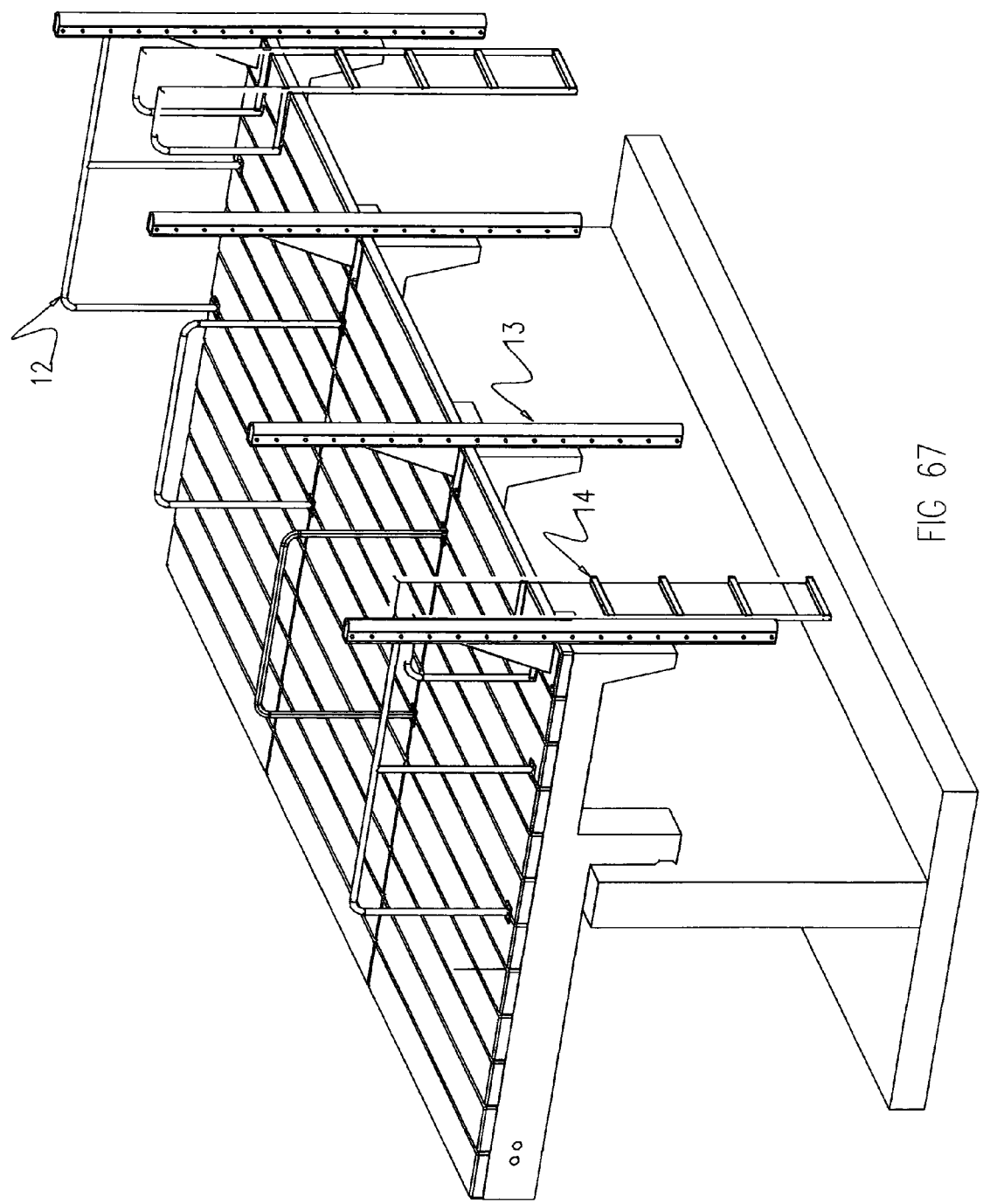
Figure 68:
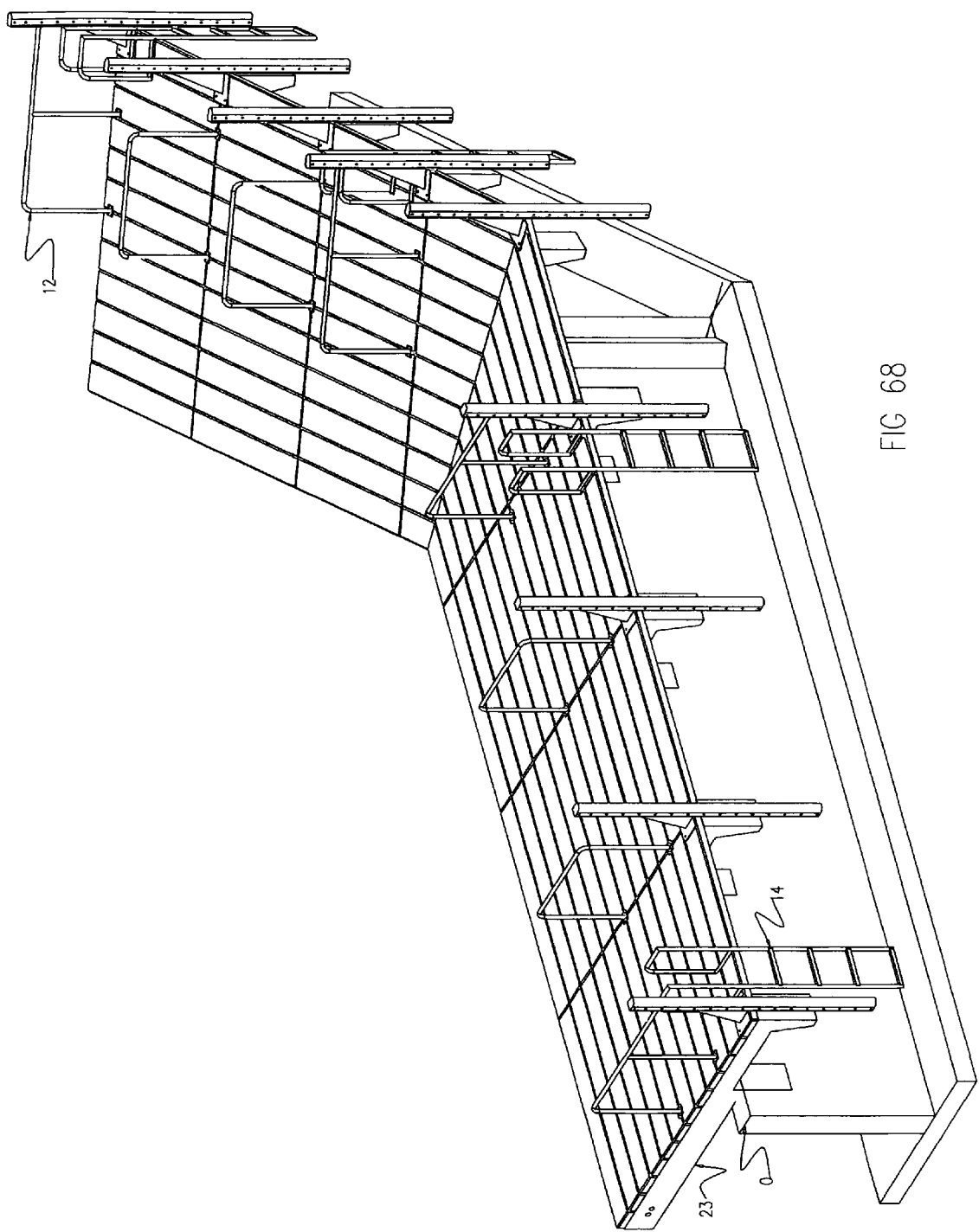

If desired, more units may be added in the exact same manner above-described (in the appropriate dimensions i.e. end-to-end, end-to-center or center-to-center) and other optional components may be added (attached with typical concrete anchoring devices or fasteners) such as hand rail(s) 14, boat bumper-rails 15 (either vertical or horizontal) and water access ladder(s) 16 as shown in FIG. 23, FIG. 45 and FIG. 67. Optionally, a slip resistance surface coating may be applied to one, some or all of the slabs or beams. Or, roughened top surfaces of the slabs or beams may be integrated in the forms when manufactured in the pre-cast plant.

Two additional embodiments are also envisioned, among others. The next embodiment would be made and used by repeating the steps and acts exactly as described above but modified and referenced as in FIGS. 25-46. This embodiment is a deck-with-drop-dock. The main difference of this embodiment is the shape of the drop-cantilever beam 21. As shown in and disclosed in FIGS. 25, 31, 33, 34, 35, 37, 38, 39, and 41-46, this embodiment uses a deck and dock with only one vertical level difference of the horizontal planes of the deck and dock. This is contrasted to the previous preferred embodiment which uses intermediate steps for more than one vertical level difference of the horizontal planes of the deck and dock.

Another embodiment would also be made and used exactly as described above but modified and referenced as in FIGS. 47-68. This embodiment is a straight-deck-with-dock. The main difference of this embodiment is the shape of the straight-cantilever beam 23. As shown in FIGS. 47, 53, 55, 56, 57, 59, 60, 61, and 65-68, this embodiment uses a deck and dock with no vertical level difference of the horizontal planes of the deck and dock.

As will be apparent to persons skilled in the art, such as a structural engineer, pre-cast concrete manufacturer or pre-cast concrete builder, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment and alternate embodiments of this invention are well known by those skilled in the art. Instead, the invention is limited and defined solely by the following claims.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An article of manufacture, comprising: a cantilevered structural support further comprising at least one horizontal or nearly horizontal member of sufficient weight, strength, length, width and depth further comprising an inland end and a water end, wherein the horizontal or nearly horizontal member is set on top of and perpendicular to an existing sea wall to define the inland end and the water end of the horizontal or nearly horizontal member, and wherein the horizontal or nearly horizontal member further comprises a first horizontal or nearly horizontal surface portion for placement substantially against a horizontal or nearly horizontal surface of the sea wall, and a second vertical or nearly vertical surface portion extending from the first horizontal or nearly horizontal surface portion for placement substantially against a vertical or nearly vertical surface of the sea wall, the first surface portion and the second surface portion being the only surfaces of the horizontal or nearly horizontal member to be in substantial contact with the sea wall when the horizontal or nearly horizontal member is set on top of the sea wall.

2. The article of manufacture of claim 1 further comprising at least one earth anchor integrated into the inland end of the horizontal or nearly horizontal member.

3. The article of manufacture of claim 1 further comprising at least one deck integrated onto the top surface of the inland end of the horizontal or nearly horizontal member.

4. The article of manufacture of claim 1 further comprising at least one dock integrated onto the top surface of the water end of the horizontal or nearly horizontal member.

5. The article of manufacture of claim 1 wherein said horizontal or nearly horizontal member further comprises a pre-cast reinforced concrete beam.

6. The article of manufacture of claim 1 further comprising additional components selected from the group consisting of hand rail(s), boat bumper-rail(s) and water access ladder(s), either alone or in combination.

7. The article of manufacture of claim 1 further comprising a pre-cast reinforced concrete sea wall.

8. The article of manufacture of claim 5 further comprising chemicals added to the concrete during manufacture selected from the group of chemicals consisting of hardening, curing and salt-resistant chemicals.

9. The article of manufacture of claim 1, further comprising a plurality of the cantilevered structural supports at desired intervals along the seawall to allow boats to be moored between the cantilever structural supports.

10. The article of manufacture of claim 1, wherein the second vertical or nearly vertical surface portion comprises a heel for placement against a portion of the sea wall.

11. The article of manufacture of claim 1, wherein the second vertical or nearly vertical surface portion comprises a recess to accommodate a cushioning material between the horizontal or nearly horizontal member and the sea wall.

* * * * *

UNITED STATES PATENT AND TRADEMARK OFFICE
CERTIFICATE OF CORRECTION

| | |
|---|---|
| PATENT NO. | : 7,401,999 B2 |
| APPLICATION NO. | : 11/350066 |
| DATED | : July 22, 2008 |
| INVENTOR(S) | : Laurie Ann DelZotto |

It is certified that error appears in the above-identified patent and that said Letters Patent is hereby corrected as shown below:

Title Page; item (74); should read;

Attorney, Agent or Firm - Frank B. Arenas, Esq.

Signed and Sealed this

Seventh Day of October, 2008

JON W. DUDAS
*Director of the United States Patent and Trademark Office*